(12) United States Patent
Jacobsen

(10) Patent No.: US 9,168,836 B2
(45) Date of Patent: Oct. 27, 2015

(54) NON-TRACTION BATTERY CONTROLLER AND APPLICATIONS THEREOF

(71) Applicant: POWIN ENERGY CORPORATION, Tualatin, OR (US)

(72) Inventor: Kyle David Jacobsen, Troultdale, OR (US)

(73) Assignee: Powin Energy Corporation, Tualatin, OR (US)

( * ) Notice: Subject to any disclaimer, the term of this patent is extended or adjusted under 35 U.S.C. 154(b) by 45 days.

(21) Appl. No.: 14/105,952

(22) Filed: Dec. 13, 2013

(65) Prior Publication Data

US 2015/0165913 A1   Jun. 18, 2015

(51) Int. Cl.
| | |
|---|---|
| *B60L 9/00* | (2006.01) |
| *B60W 10/02* | (2006.01) |
| *B60L 11/02* | (2006.01) |
| *H02J 7/00* | (2006.01) |
| *B60W 10/26* | (2006.01) |

(52) U.S. Cl.
CPC .............. *B60L 11/02* (2013.01); *B60W 10/26* (2013.01); *H02J 7/0052* (2013.01); *B60W 2510/06* (2013.01); *B60W 2510/244* (2013.01); *B60W 2710/248* (2013.01)

(58) Field of Classification Search
USPC ................................................. 701/22; 477/5
See application file for complete search history.

(56) References Cited

U.S. PATENT DOCUMENTS

| | | | |
|---|---|---|---|
| 7,497,285 B1 * | 3/2009 | Radev ...................... | 180/65.225 |
| 8,111,036 B2 | 2/2012 | Rosenstock | |
| 2005/0230976 A1 * | 10/2005 | Yang ........................... | 290/4 R |
| 2006/0116797 A1 * | 6/2006 | Moran ............................. | 701/22 |
| 2007/0124037 A1 * | 5/2007 | Moran ............................. | 701/22 |
| 2007/0191180 A1 * | 8/2007 | Yang .................. | 477/5 |
| 2009/0222158 A1 * | 9/2009 | Kubota et al. ................... | 701/22 |
| 2010/0145562 A1 * | 6/2010 | Moran ............................. | 701/22 |
| 2011/0133920 A1 | 6/2011 | Meadors | |
| 2011/0137502 A1 * | 6/2011 | Kato et al. ...................... | 701/22 |
| 2011/0231049 A1 * | 9/2011 | Le Brusq et al. ............... | 701/22 |
| 2012/0303225 A1 * | 11/2012 | Futahashi et al. ............... | 701/50 |

OTHER PUBLICATIONS

Chris Bakken and Ives Meadors, applicants; U.S. Appl. No. 61/313,548; publicly available as of Jun. 9, 2011 (filing date Mar. 12, 2010); 14 pages including filing receipt, provisional cover sheet, and EFS receipt.

* cited by examiner

*Primary Examiner* — Thomas G Black
*Assistant Examiner* — Tyler Paige
(74) *Attorney, Agent, or Firm* — Sterne, Kessler, Goldstein & Fox P.L.L.C.

(57) ABSTRACT

A non-traction battery controller, and applications thereof. In an embodiment, the non-traction battery controller includes a main processor, a battery management module, a vehicle communication module, and a charge control module. During operation, when the vehicle communication module signals the processor that an engine of a vehicle is operating and the battery management module signals the processor that a connected battery has a value less than a first control value, a computer program code stored in a memory coupled to the processor causes the processor to signal the charge control module to charge the connected battery. When the vehicle communication module signals the processor that the vehicle engine is operating and the battery management module signals the processor that the connected battery has a value between first and second control value, the computer program code causes the processor to signal the charge control module to selectively charge the connected battery.

20 Claims, 20 Drawing Sheets

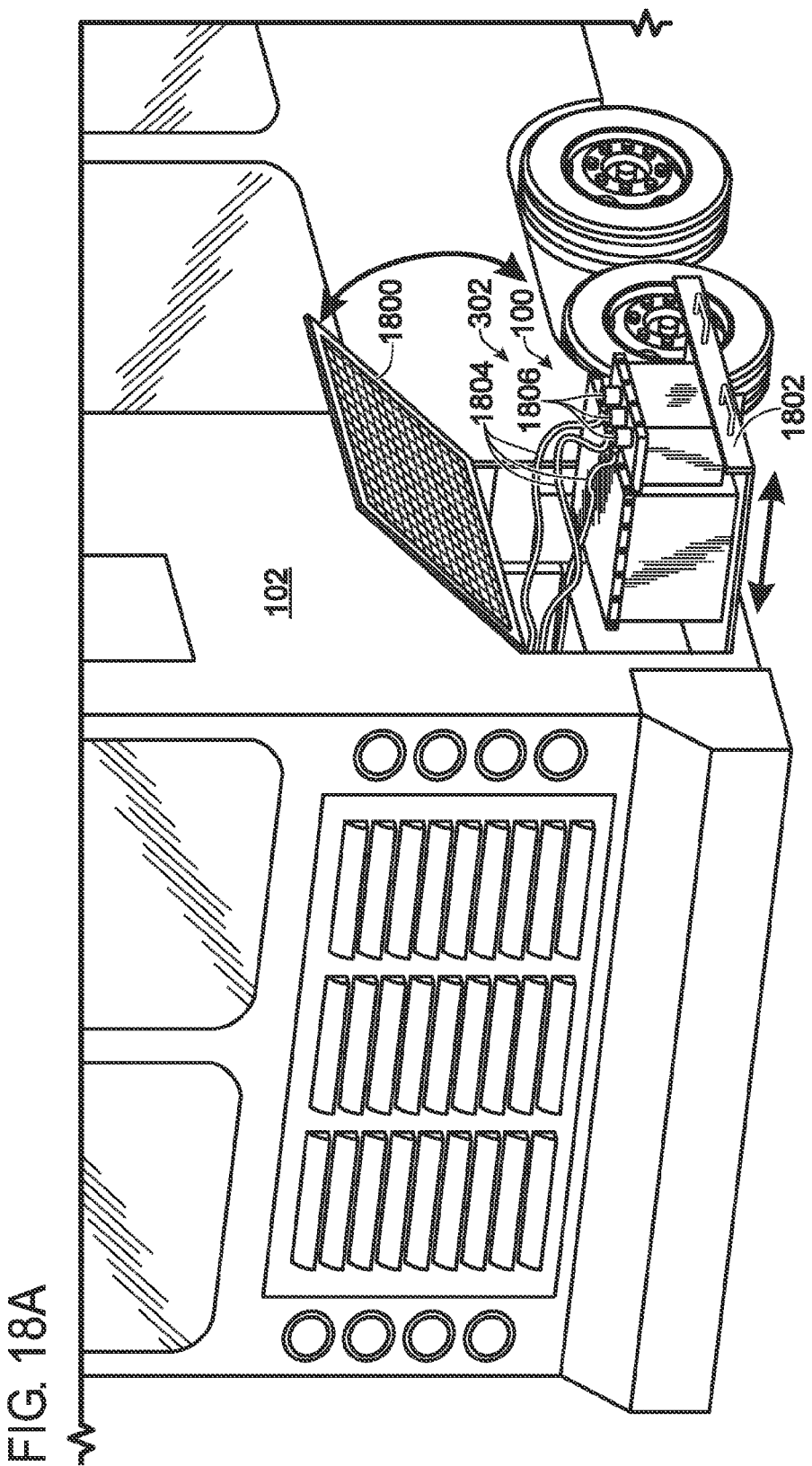

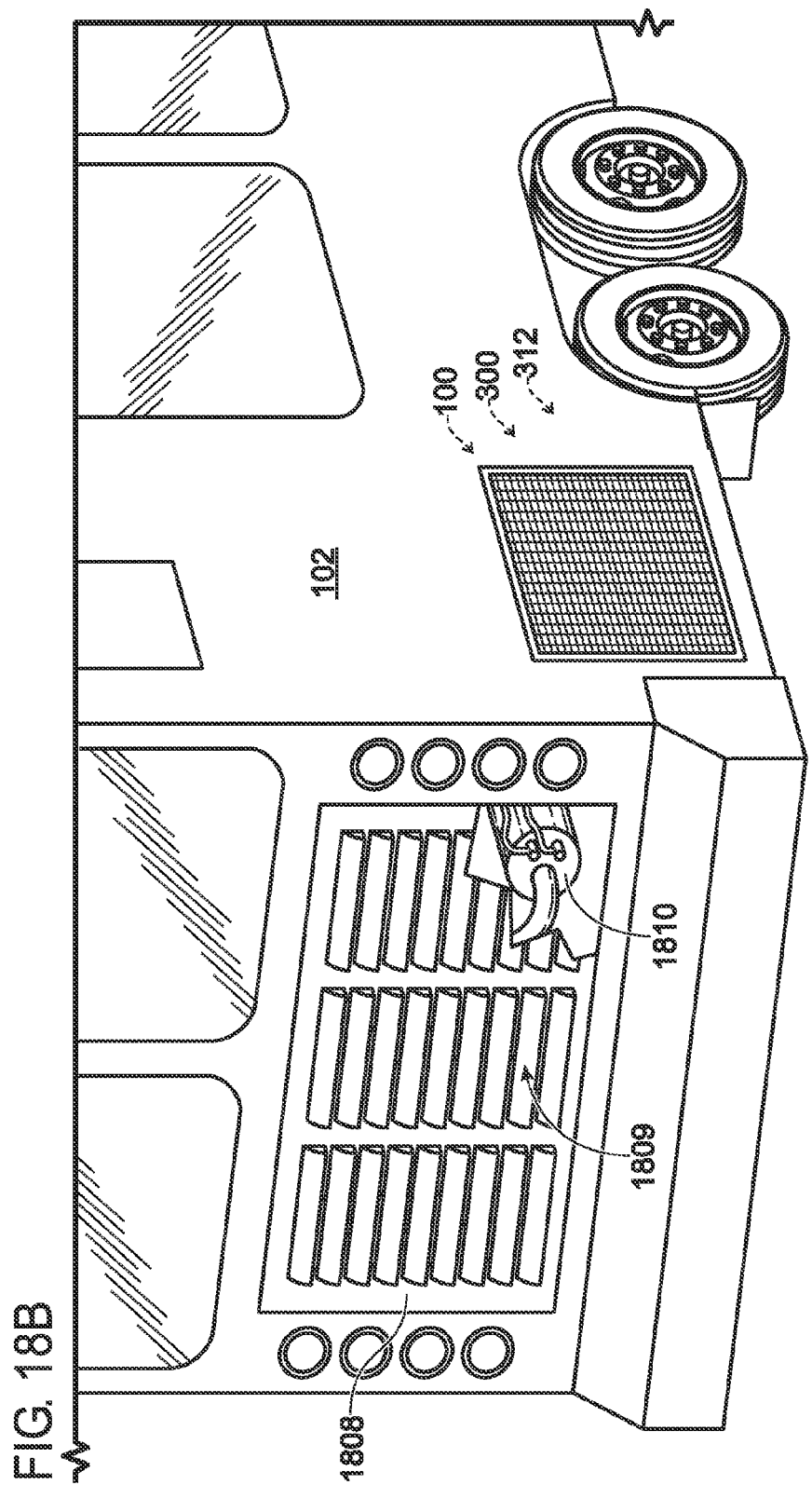

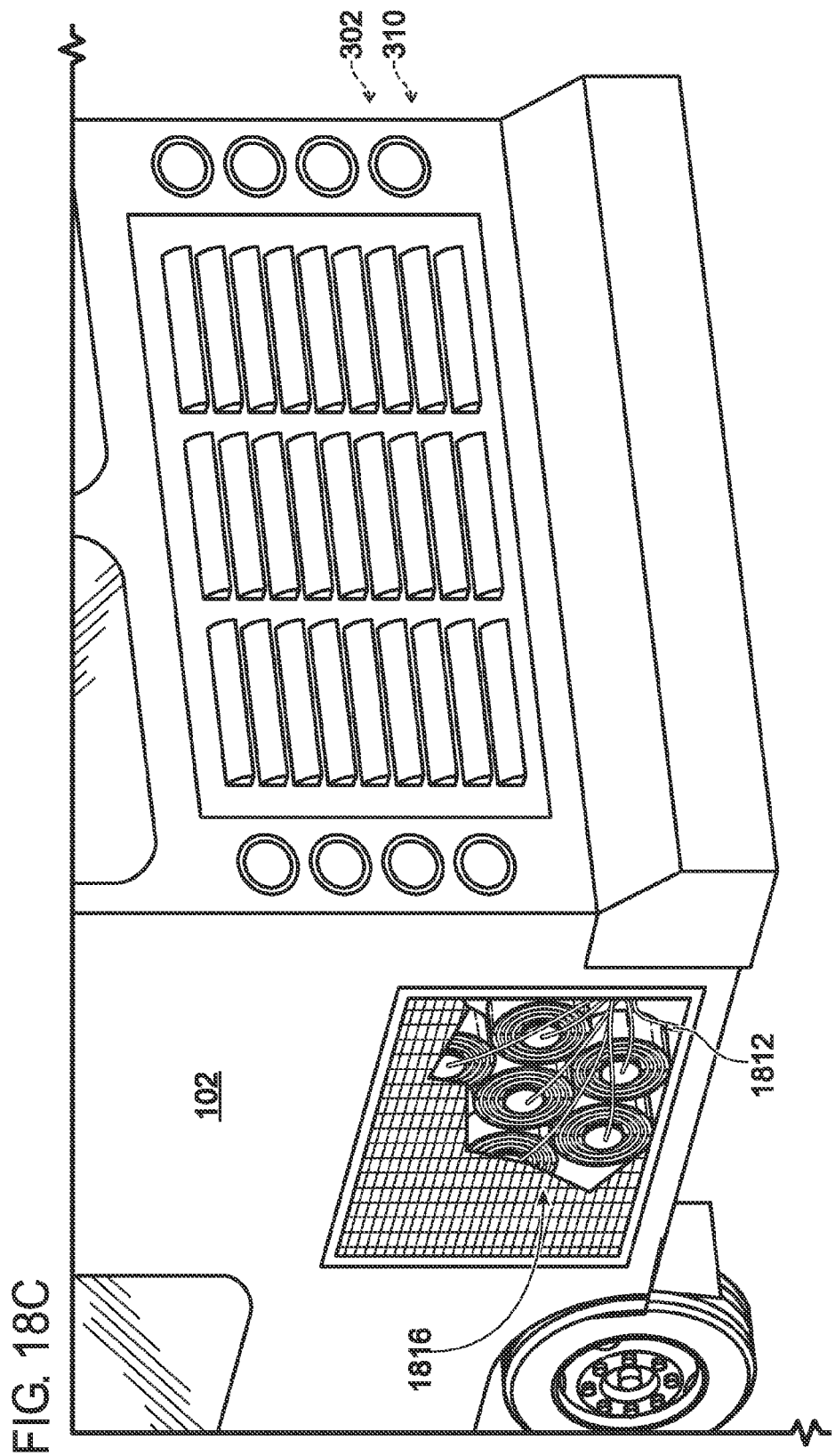

NON-TRACTION BATTERY CONTROLLER AND APPLICATIONS THEREOF

FIELD OF THE INVENTION

The present invention generally relates to battery controllers. More particularly, it relates to non-traction battery controllers, and applications thereof.

BACKGROUND

It is known that vehicle fuel efficiency is a major concern. Many people, businesses and government organizations are concerned with the rising cost of fossil fuels, the rising levels of air pollution and the threat of global warming. What are needed are batteries and battery controllers that can operate more efficiently than conventional batteries and battery controllers, and thereby improve vehicle fuel efficiency.

BRIEF SUMMARY

The present disclosure provides a non-traction battery controller, and applications thereof. In an embodiment, the non-traction battery controller includes a main processor, a battery management module, a vehicle communication module, and a charge control module. During operation, when the vehicle communication module signals the processor that an engine of a vehicle is operating and the battery management module signals the processor that a connected battery has a value less than a first control value, a computer program code stored in a memory coupled to the main processor causes the main processor to signal the charge control module to charge the connected battery. When the vehicle communication module signals the processor that the engine of the vehicle is operating and the battery management module signals the processor that the connected battery has a value between the first control value and a second control value, the computer program code causes the processor to signal the charge control module to selectively charge the connected battery.

In an embodiment, during periods when the battery is selectively charged, the computer program code causes the connected battery to be preferably charged, for example, when the vehicle is braking or slowing down, and to not be charged when the vehicle is idling or accelerating, which thereby increases the fuel efficiency of the vehicle.

Further embodiments, features, and advantages of the invention, as well as the structure and operation of various embodiments of the invention, are described in detail below with reference to the accompanying drawings.

BRIEF DESCRIPTION OF THE DRAWINGS/FIGURES

The accompanying drawings/figures, which are incorporated herein and form a part of the specification, illustrate the present invention and, together with the description, further serve to explain the principles of the invention and to enable a person skilled in the pertinent art to make and use the invention. Additionally, the left-most digit or digits of a reference number identify the drawing in which the reference number first appears.

FIGS. 18A-C are diagrams that illustrates how a non-traction battery pack according to an embodiment of the present invention can be installed in a bus.

Figure 19:
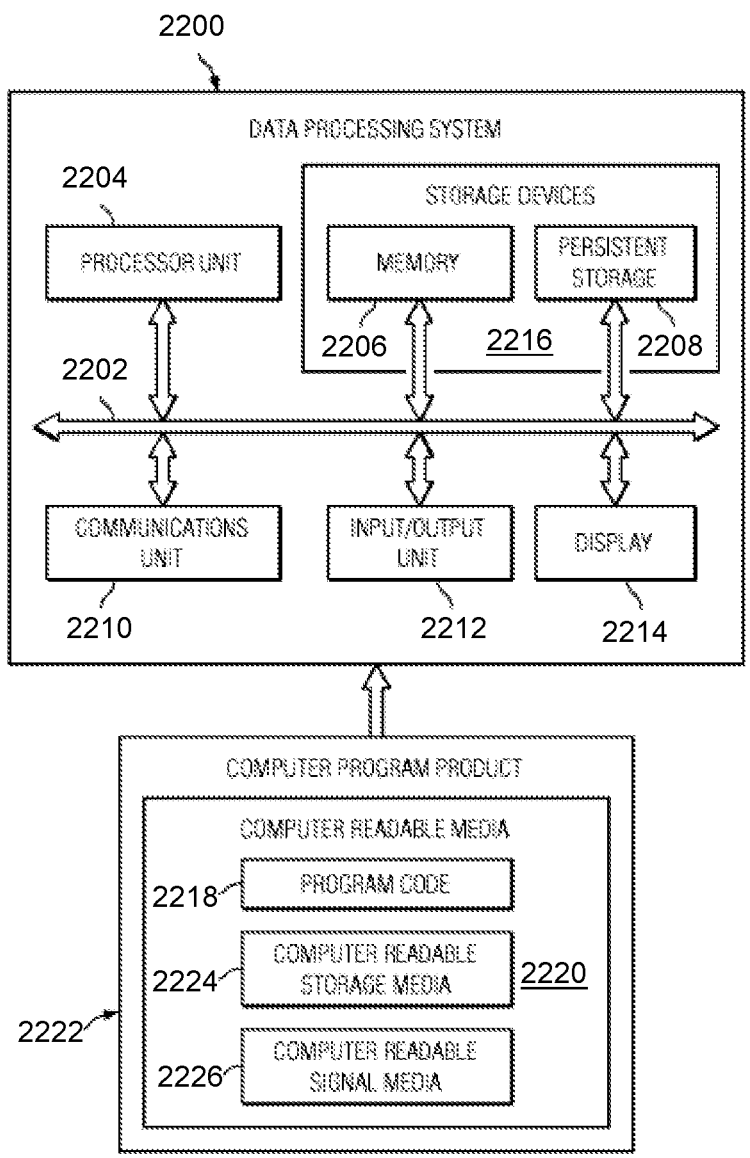

FIG. 19 is a block diagram of a data processing system in which illustrative embodiments may be implemented.

DETAILED DESCRIPTION

The present invention provides a non-traction battery controller, and applications thereof. In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment, the non-traction battery controller includes a main processor, a battery management module, a vehicle communication module, and a charge control module. During operation, when the vehicle communication module signals the processor that an engine of a vehicle is operating and the battery management module signals the processor that a connected battery has a value less than a first control value, a computer program code stored in a memory coupled to the main processor causes the main processor to signal the charge control module to charge the connected battery. When the vehicle communication module signals the processor that the engine of the vehicle is operating and the battery management module signals the processor that the connected battery has a value between the first control value and a second control value, the computer program code causes the processor to signal the charge control module to selectively charge the connected battery.

In an embodiment, during periods when the battery is selectively charged, the computer program code causes the connected battery to be preferably charged, for example, when the vehicle is braking or slowing down, and to not be charged when the vehicle is idling or accelerating, which thereby increases the fuel efficiency of the vehicle.

Figure 1:
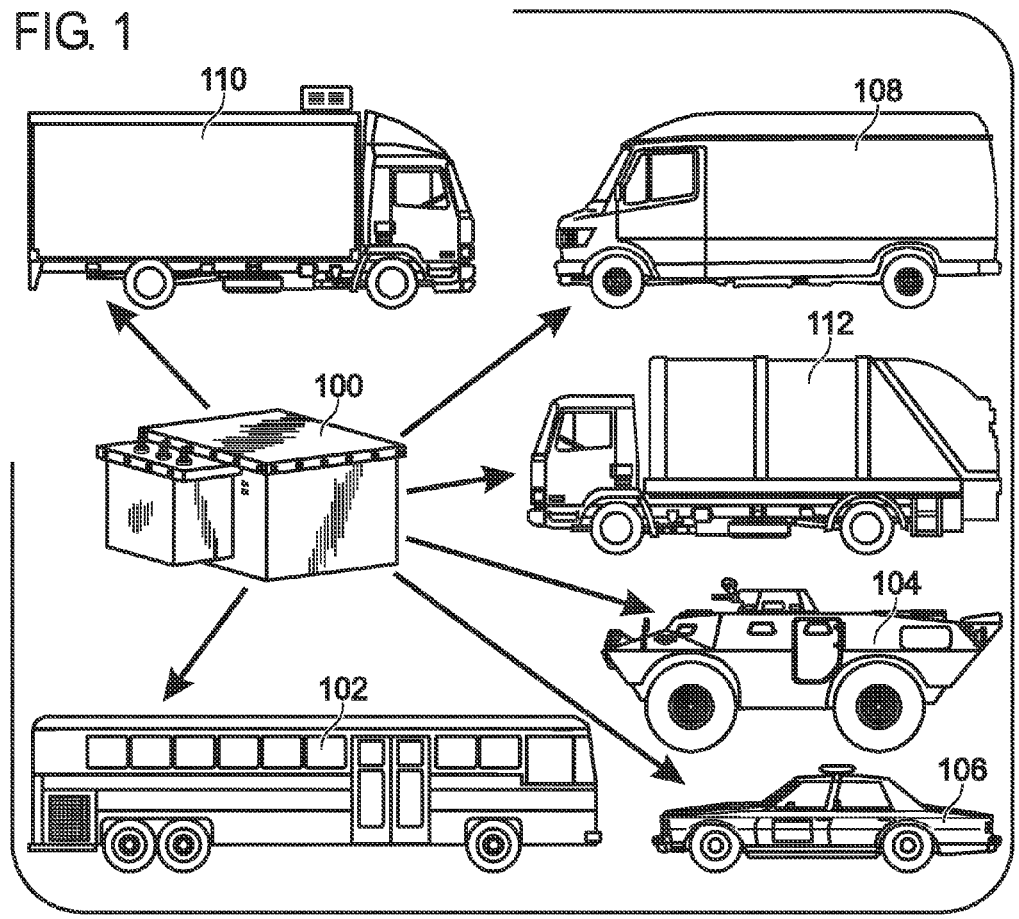
FIG. 1 is a diagram that illustrates various vehicles in which a non-traction battery pack and non-traction battery controller according to the present invention can be used.

FIG. 1 is a diagram that illustrates various vehicles in which a non-traction battery pack 100 according to the present invention can be used. These vehicles include, but are not limited to, a bus 102, an armored vehicle 104, a police car 106, a delivery truck 108, a refrigerated delivery truck 110, and a garbage truck 112. What is common about these vehicles is that they spend significant amounts of time idling and/or they start and stop frequently compared to other types of vehicles.

Figure 2:
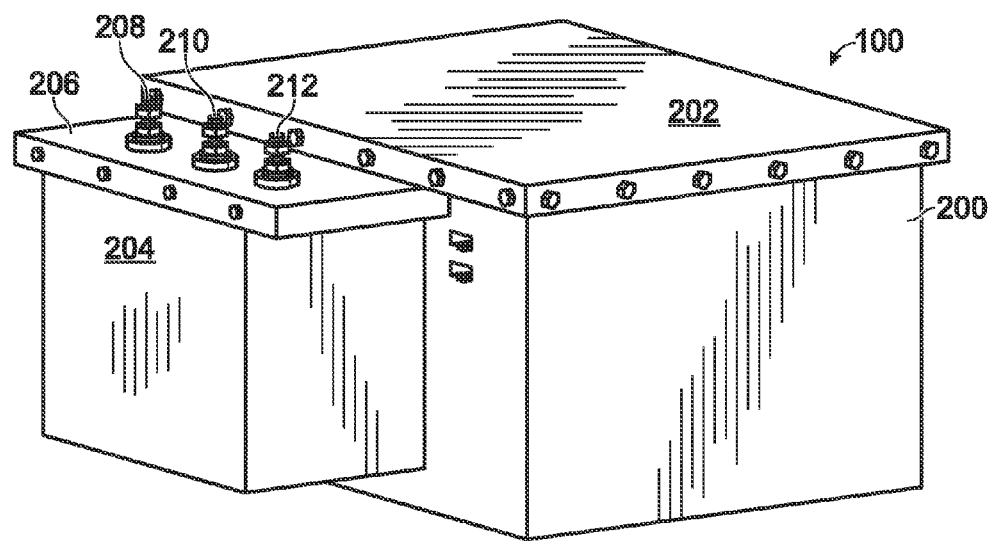
FIG. 2 is a perspective view that illustrates an embodiment of a non-traction battery pack according to the present invention.

FIG. 2 is a diagram that further illustrates non-traction battery pack 100. Non-traction battery pack has a size and shape that allows it to be installed in a vehicle such as, for example, bus 102. Different vehicles may require different size battery packs to power the vehicle's non-traction loads and different shaped battery packs for ease of installation.

As shown in FIG. 2, non-traction battery pack 100 includes a battery pack housing 200, a battery pack cover 202, a battery equalizer housing 204 (e.g., if an equalizer is included in the battery pack as explained in more detail below), and a battery equalizer cover 206. Extending through battery equalizer cover 206 are three battery terminals 208, 210, and 212. In an embodiment, battery terminal 208 is the battery pack ground. Battery terminal 210 provides 12 volt battery power. Battery terminal 212 provides 24 volt battery power.

Figure 3:
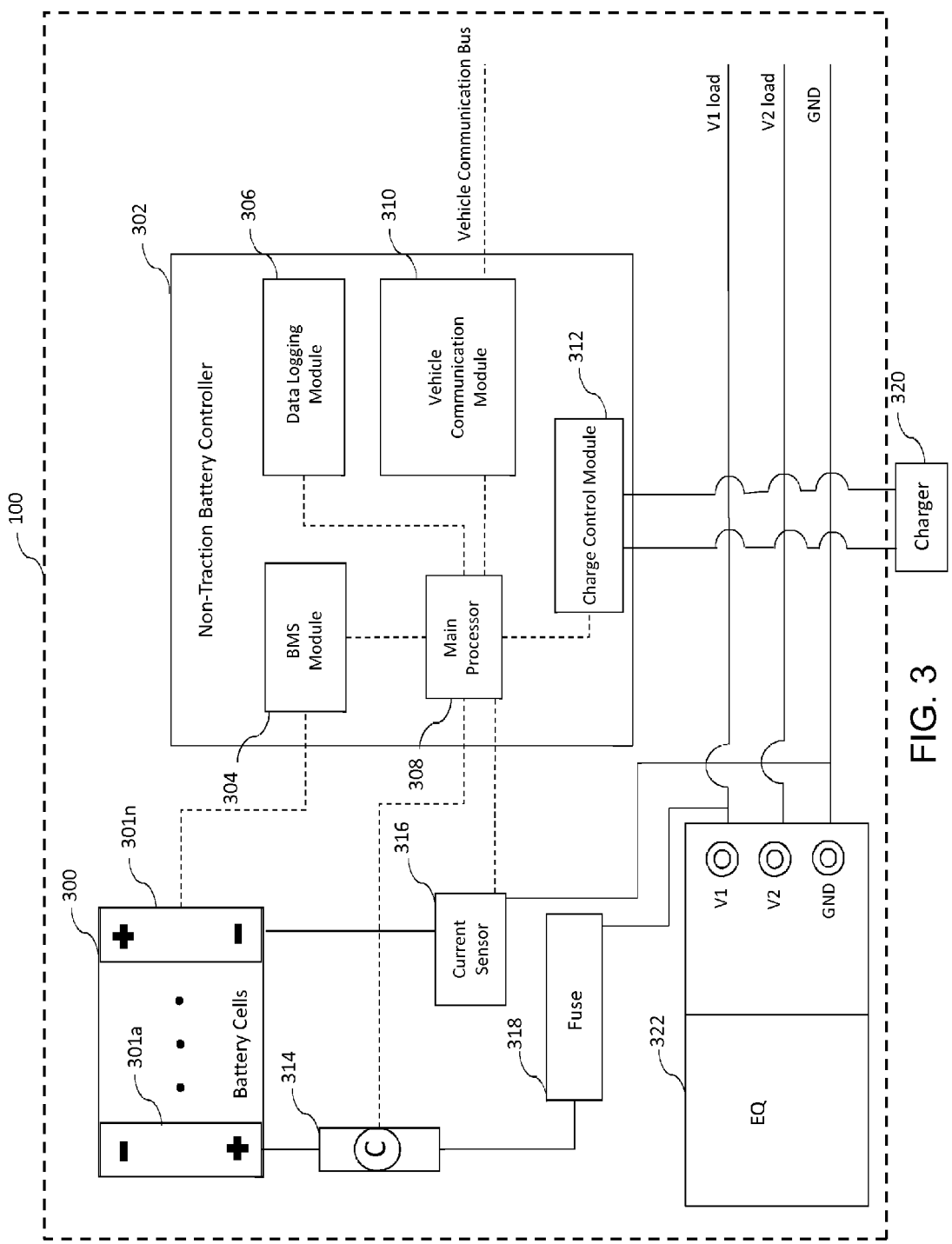
FIG. 3 is a diagram that illustrates an embodiment of a non-traction battery pack according to the present invention.

FIG. 3 is a diagram that further illustrates non-traction battery pack 100. As shown in the figure, non-traction battery pack 100 includes a battery 300 having a number of battery cells 301a-n, a non-traction battery controller 302, a contactor 314, a current sensor 316, a fuse 318 and a battery equalizer 322. Non-traction battery controller 302 includes a battery management system (BMS) module 304, a data logging module 306, a main processor 308, a vehicle communication module 310, and a charge control module 312.

In operation, non-traction battery controller 302 monitors the state of battery 300 and controls when a charger 320 provides current to charge battery 300 as described in more detail below with reference, for example, to FIGS. 12-17. In embodiments of the present invention in which battery 300 is a lithium ion battery, BMS module 304 monitors the voltage of battery cells 301a-n of battery 300 and provides these cell voltages to main processor 308. The sum of these voltages is the voltage of battery 300. BMS module 304 also monitors the temperature of battery 300 and provides this information to main processor 308. The voltage and temperature values are used to ensure that battery cells 301a-n are neither overcharged nor over-discharged. When computer program code running on main processor 308 determines, for example, that a battery cell 301 of battery 300 is less than an under-voltage protection value or greater than an over-voltage protection value, main processor 308 causes contactor 314 to open to protect battery 300. A fuse 318 in series with contactor 314 is used for over-current protection.

The state of charge of battery 300 is determined using current sensor 316. Current sensor 316 monitors the current flow into and the current flow out of battery 300 and provides this information to main processor 308. In embodiments, current sensor 316 is a Hall-effect type current sensor. Other types of current sensors are used in other embodiments.

Vehicle communication module 310 receives messages from a vehicle's communication bus, decodes the received messages, and provides the decoded information to main processor 308. In an embodiment, the messages received and decoded include messages about whether the vehicle's ignition is on, whether the vehicle is moving, the vehicle's engine speed (e.g., in revolutions per minute), the position of the vehicle's accelerator pedal, the vehicle's rate of fuel consumption, etc. In an embodiment, the messages received are CANBus messages that conform to the Society of Automotive Engineers SAE J1939 standards.

Charge control module 312 receives battery charge signals from main processor 308 and controls charger 320 accordingly to charge battery 300. In an embodiment, charger 320 is an engine-driven vehicle alternator and charge control module 312 generates a pulse width modulation signal that controls a field current of the engine-driven alternator. More details about how this works is described below with reference, for example, to FIGS. 12-17.

In embodiments of the present invention, non-traction battery pack 100 is required to provide more than one output voltage in order to power the various loads of the vehicle in which non-traction battery pack 100 is installed. This is done using battery equalizer 322.

In the example illustrated in FIG. 3, two voltages (i.e., voltages V1 and V2) are available from non-traction battery pack 100. Voltage V1 (e.g., 24 volts) is preferably used to power most of the vehicle's DC loads. Voltage V1 is the output voltage of non-traction battery 300. Voltage V2 (e.g., 12 volts) is used to power a subset of the DC loads of the vehicle. Battery equalizer 322 gets its input power from all of the battery cells 301a-n of non-traction battery 300 and provides voltage V2 in a manner that draws power equally from all of the battery cells 301a-n of non-traction battery 300.

In some embodiments of the present invention, the vehicle in which non-traction battery 300 is installed may already have its own on-board battery equalizer. In these embodiments, either the vehicle's on-board battery equalizer should be disabled/removed or battery equalizer 322 should be disabled/removed.

Data logging module 306 is used to log various information relating to the operation and health of non-traction battery pack 100. This logged information can be retrieved and reviewed, for example, to determine how non-traction battery pack 100 is performing and/or how much the fuel efficiency of the vehicle in which non-traction battery pack 100 is installed has increased due to the use of non-traction battery pack 100. In embodiments, data logging module 306 logs information about the voltages and temperatures of battery cells 301a-n, the state of charge of non-traction battery 300, the ground speed of the vehicle in which non-traction battery 300 is installed, and the rate at which fuel is being consumed by the vehicle. Additional information that may be logged is described below with reference, for example, to FIGS. 12-17.

Figure 4:
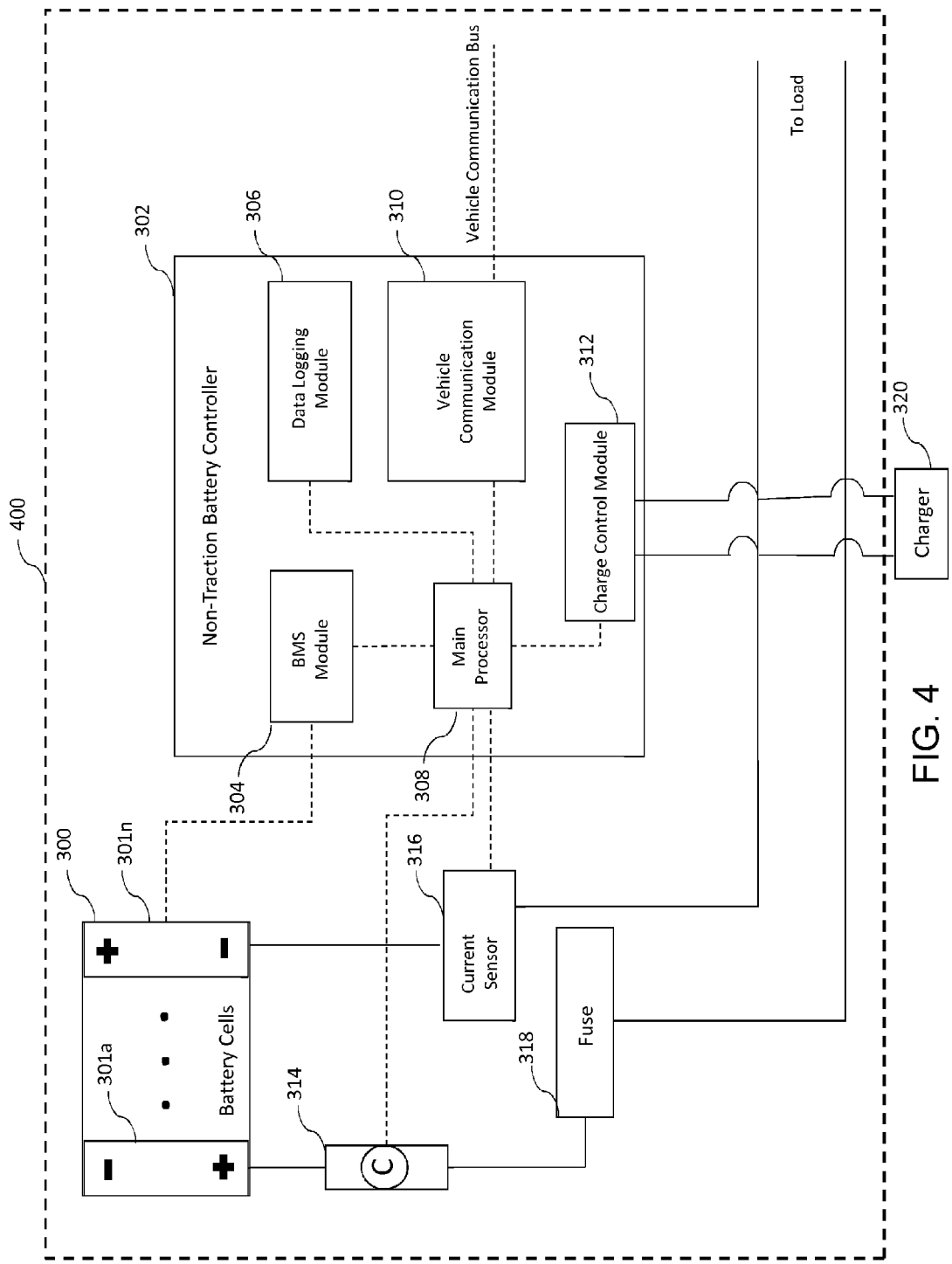
FIG. 4 is a diagram that illustrates an embodiment of a non-traction battery pack according to the present invention.

FIG. 4 is a diagram that illustrates a non-traction battery pack 400. Non-traction battery pack 400 is similar to non-traction battery pack 100, but it does not include a battery equalizer such as, for example, battery equalizer 322. Non-traction battery pack 400 is intended, for example, to be used in vehicles whose DC loads only require one DC voltage or in vehicles that have an on-board battery equalizer.

Figure 5:
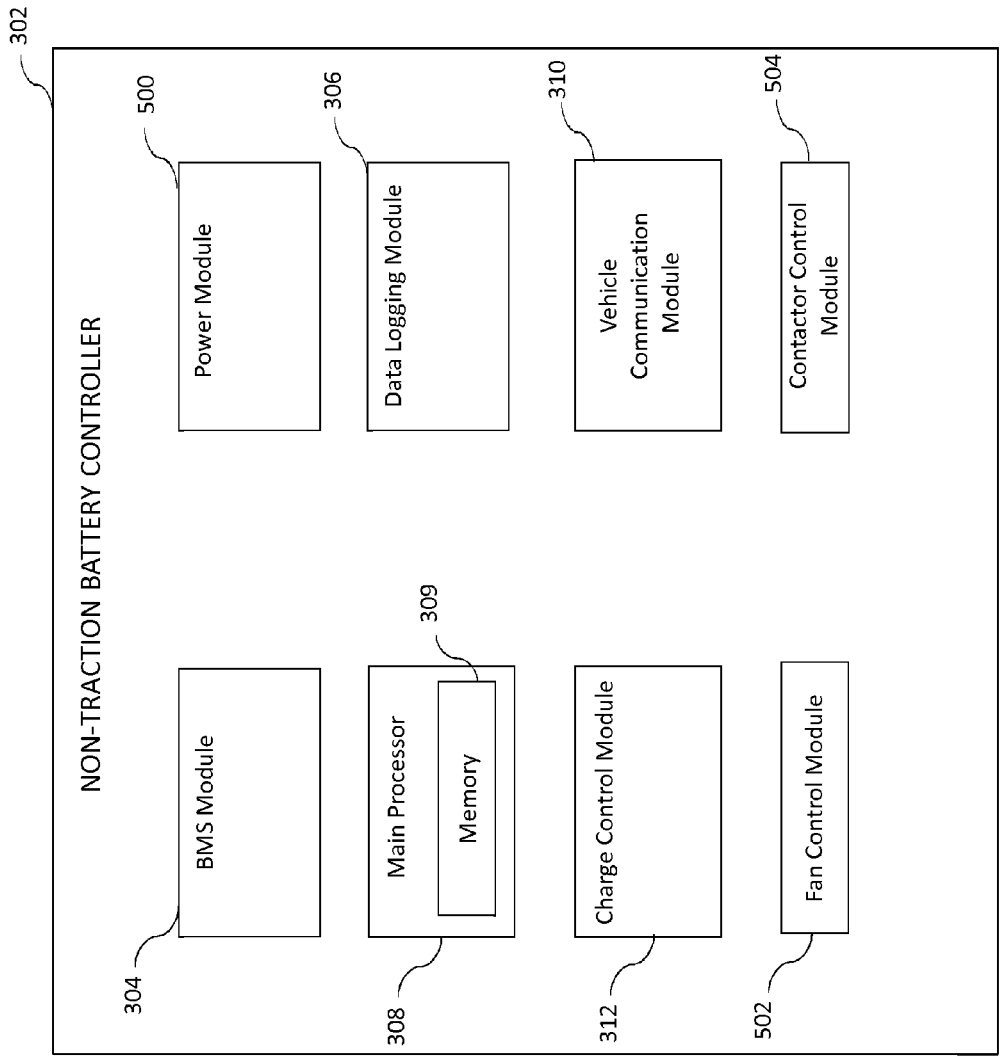
FIG. 5 is a diagram that illustrates an embodiment of a non-traction battery controller according to the present invention.

FIG. 5 is a diagram that further illustrates non-traction battery controller 302 according to an embodiment of the present invention. As shown in FIG. 5, non-traction battery controller 302 includes a power module 500, a fan control module 502, and a contactor control module 504. These modules are in addition to the BMS module 304, data logging module 306, main processor 308 having a memory 309, and charge control module 312 described above with reference to FIG. 3.

As shown in FIG. 5, main processor 308 includes a memory 501 that stores computer program code. This computer program code when executing on main processor 308 controls the operation of non-traction battery pack 100. This operation is described below with reference to FIGS. 12-17.

Power module 500 provides regulated power to each of the modules of non-traction battery controller 302 that require power. In an embodiment, the power source for power module 500 is non-traction battery 300.

Fan control module 502 turns-on and turns-off one or more cooling fans. In an embodiment, fans controlled by fan control module 502 are used to provide forced air cooling of battery equalizer 322. One or more fans may also be used to cool battery box 200.

Contactor control module 504 opens and closes contactor 314 according to inputs generated by computer program code executing on main processor 308. In operation, contactor 314 is normally closed. When computer program code executing on main processor 308 determines that contactor 314 should be opened to prevent either the over-charging or over-discharging of non-traction battery 300, main processor 308 signals to contactor control module 504 that contactor 314 should be opened. Contactor control module 504 than applies a signal to contactor 314 to open contactor 314.

Figure 6:
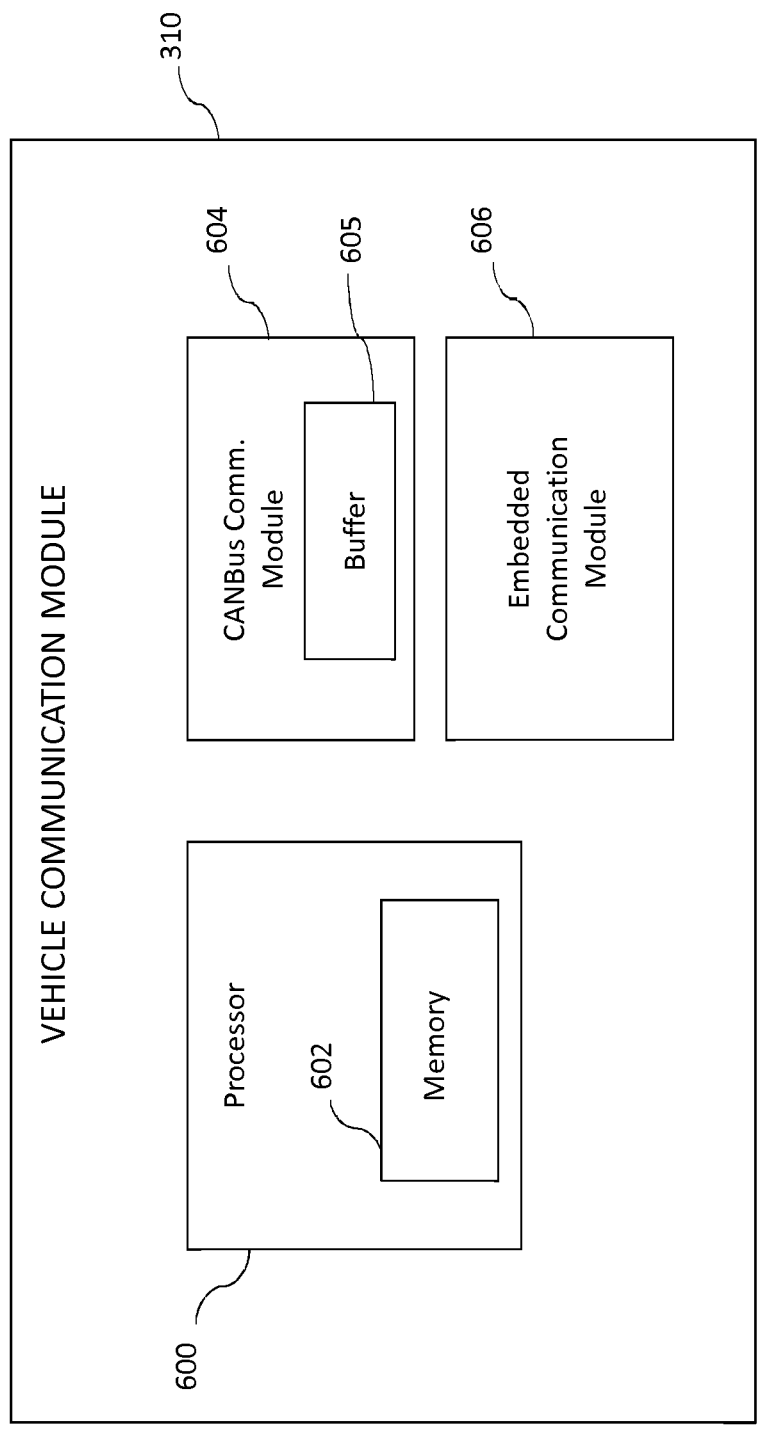
FIG. 6 is a diagram that illustrates an embodiment of a vehicle communication module according to the present invention.

FIG. 6 is a diagram that further illustrates vehicle communication module 310 according to an embodiment of the present invention. As show in FIG. 6, vehicle communication module 310 includes a processor 600 having a memory 602, a CANBus communication module 604 having a buffer 605, and an embedded communication module 606.

In operation, vehicle communication module 310 communicates with various components of the vehicle in which non-traction battery pack 100 is installed. In embodiments, this communication takes place using computer program code executing on processor 600 and CANBus communication module 604 as described in more detail below.

Embedded communication module 606 is responsible for enabling vehicle communication module 310 to communicate with main processor 308. In embodiments, embedded communication module 606 implements serial peripheral interface (SPI) communications between vehicle communication module 310 and main processor 308.

Figure 7:
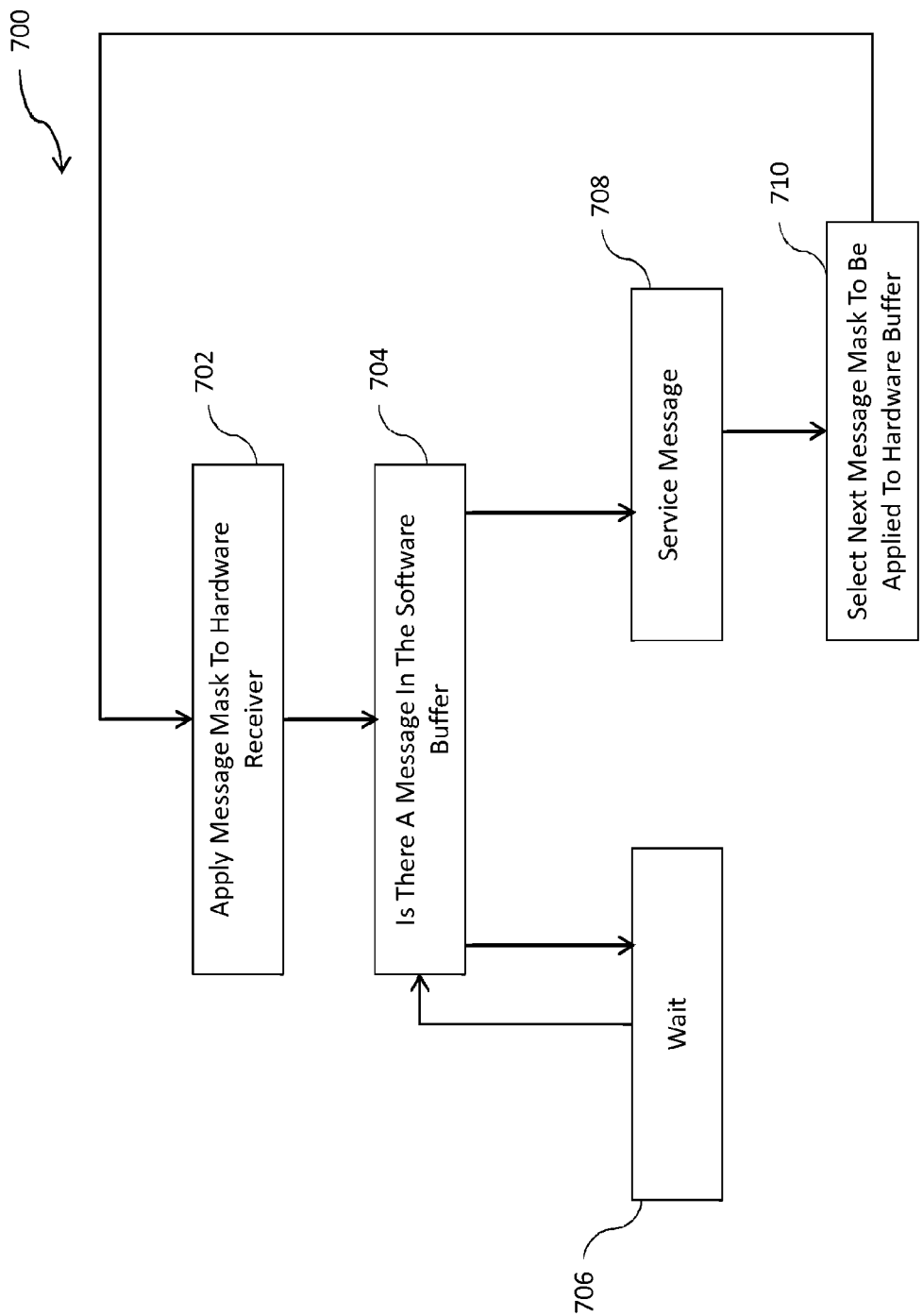
FIG. 7 is a diagram of a flowchart that illustrates computer program code for receiving vehicle messages according to an embodiment of the present invention.

FIG. 7 is a diagram of a flowchart 700 that illustrates the operation of computer program code used to receive messages from various components of the vehicle in which non-traction battery pack 100 is installed. The steps of flowchart 700 are particularly useful in embodiments of the present invention in which vehicle communication module 310 is required to receive a large number of different messages in a short period of time. As shown in FIG. 7, flowchart 700 includes five steps.

In step 702, a message mask is applied to a hardware receiver such as CANBus communication module 604. This message mask allows a particular message (e.g., an accelerator pedal position message) to be received into the hardware, or buffer 605, of CANBus communication module 604. The message mask that is applied is selected by computer program code executing on processor 600.

In embodiments, when a message is received into the hardware receiver/buffer 605, the message is transferred from the hardware receiver/buffer 605 to a software buffer. One reason for transferring the message is that it frees up the hardware receiver/buffer 605 to receiver another message while waiting for the just received message to be processed by processor 600.

In step 704, a check is made to determine whether there is a message in the software buffer. In embodiments, the software buffer is a part of memory 602. If a message is present, the message is serviced in step 708. If no message is in the software buffer when the check is made, step 706 is performed.

In step 706, a wait period is implemented in order to allow a message to be received by the hardware receiver and transferred to the software buffer.

In step 708, a message residing in the software buffer is serviced. The message is serviced, for example, by reading a data value contained in the message and writing the data value to a particular memory location of processor 600 reserved for the data value. Examples of data values that are contained in received messages are presented below with reference to FIGS. 12-17.

In step 710, the next message mask to be applied to the hardware receiver/buffer 605 is selected. This selection process is implemented by computer program code executing on processor 600. After the message mask is selected, it is applied to the hardware receiver/buffer 605 in step 702, and the process shown in flowchart 700 is repeated. Applying different message masks to the hardware receiver/buffer 605 enables different types of messages to be selectively received.

Figure 8:
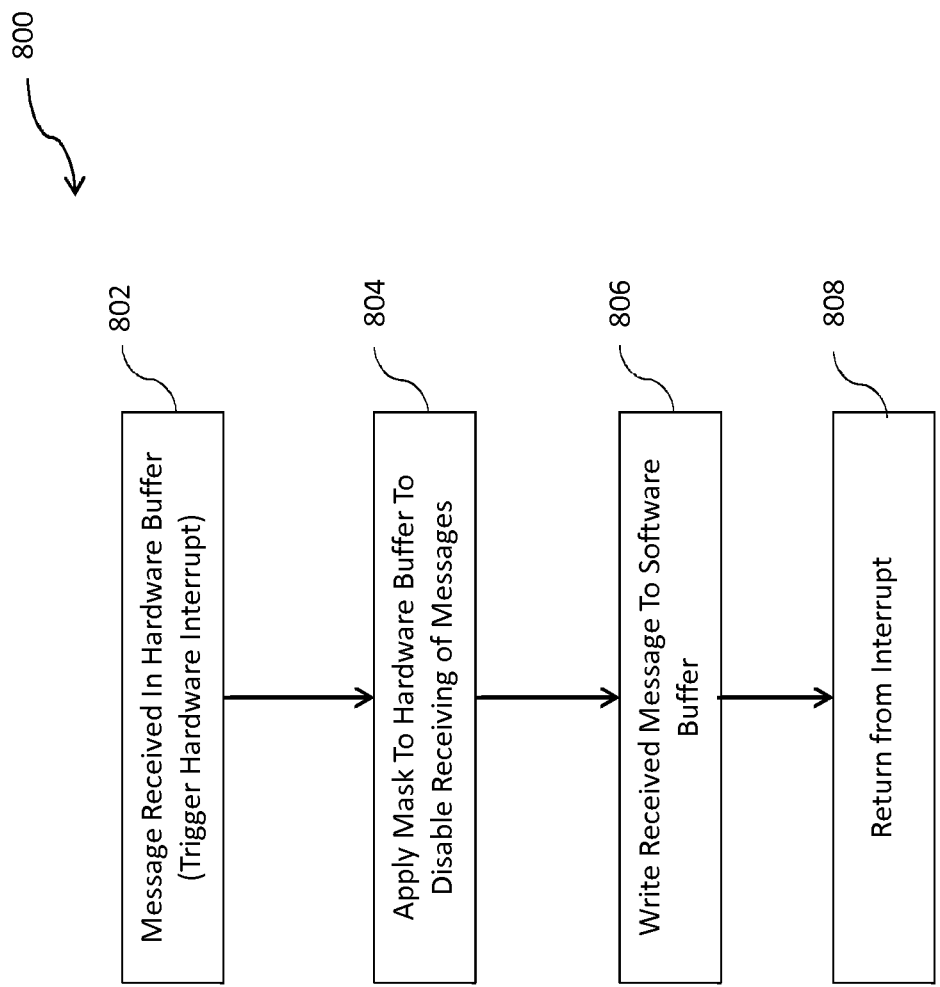
FIG. 8 is a diagram of a flowchart that illustrates computer program code for generating hardware interrupts according to an embodiment of the present invention.

FIG. 8 is a diagram of a flowchart 800 that illustrates the operation of computer program code used for transferring a message received by the hardware receiver to the software buffer. As show in FIG. 8, flowchart 800 has four steps.

In step 802, a message is received in hardware buffer 605 of CANBus communication module 604. The receipt of this message will trigger a hardware interrupt.

In step 804, a message mask is applied to hardware buffer 605 that prevents the reception of any more messages into hardware buffer 605. This is done by computer program code execution on processor 600 in order to prevent the message received in step 802 from being overwritten before it can be transferred to the software buffer.

In step 806, the message received in step 802 is transferred to the software buffer. In embodiments, the software buffer is a part of memory 602 of processor 600.

In step 808, processor 600 returns to its normal operation after completion of the interrupt routine that was triggered as a part of step 802.

Figure 9:
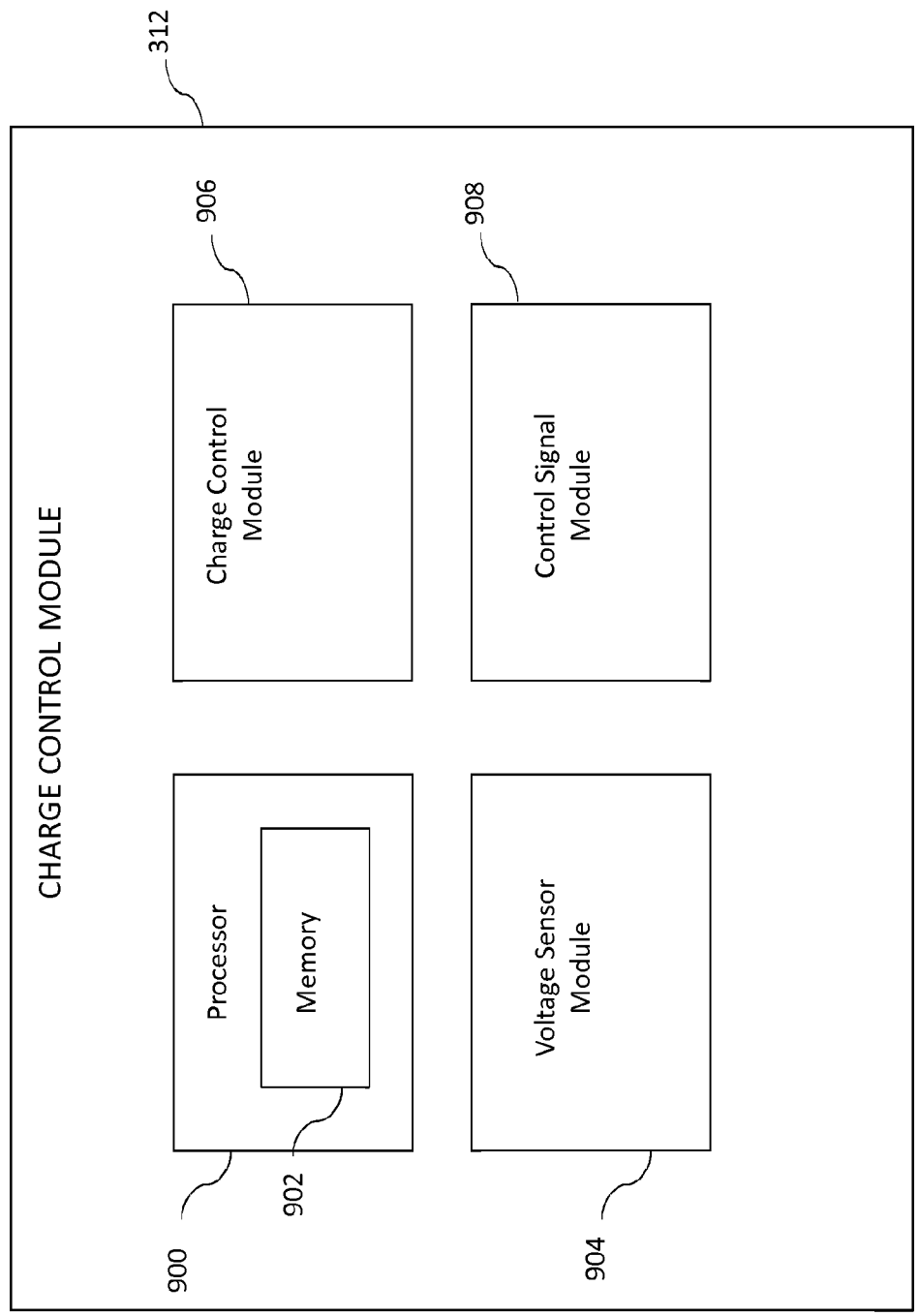
FIG. 9 is a diagram that illustrates an embodiment of a charge control module according to the present invention.

FIG. 9 is a diagram that further illustrates charge control module 312 according to an embodiment of the present invention. As shown in FIG. 9, charge control module 312 includes a processor 900 having a memory 902, a voltage sensing module 904, a charger control module 906, and a control signal module 908.

As described herein, charge control module 312 generates a signal that controls the output current of charger 320. As described below with reference to FIGS. 12-17, computer program code executing on main processor 308 determines when battery 300 should be charged. This determination is provided to control signal module 908, for example, as a charger on/off signal or a charger enable/disable signal.

In an embodiment, when control signal module 908 receives a charger on or charger enable signal, it enables charger control module 906 so that charger control module 906 can provide a signal to charger 320 that controls the output current of charger 320. In instances where charger 320 is an engine driven alternator, charger control module 906 outputs a field current for the alternator that determines how much current charger 320 produces. In another embodiment, charger control module 906 can control the output of a voltage regulator that controls the field current and thus the output current of the alternator.

During operation, voltage sensing module 904 monitors the voltage of battery 300 and ensures that charger control module 906 lowers and/or turns-off/regulates the output current of charger 320 when battery 300 reaches a predetermine voltage operating point during battery charging. In some embodiments, the voltage of battery 300 may be monitored by BMS module 304 rather than using a voltage sensing module 904, as shown in FIG. 9.

Figure 10:
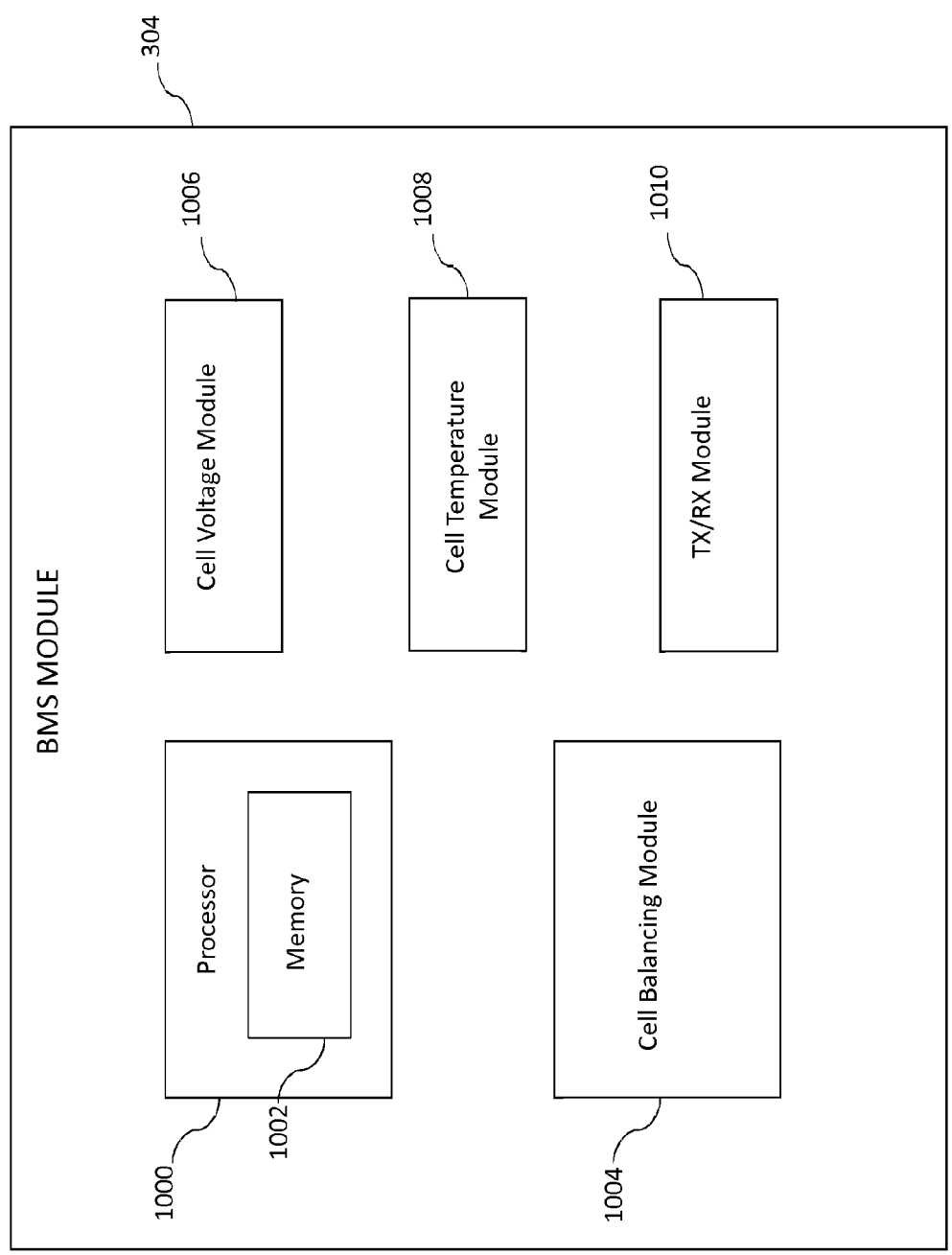
FIG. 10 is a diagram that illustrates an embodiment of a battery management system (BMS) module according to the present invention.

FIG. 10 is a diagram that further illustrates BMS module 304 according to an embodiment of the present invention. As shown in FIG. 10, BMS module 304 includes a processor 1000 having a memory 1002, a cell balancing module 1004, a cell voltage module 1006, a cell temperature module 1008, and a transmit (TX)/receive (RX) module 1010.

BMS module 304 monitors the voltages and the temperatures of the cells 301*a-n* of battery 300 and provides this information to computer program code running on main processor 308 of non-traction battery controller 302 using transmit/receive module 1010. The voltages of cells 301*a-n* are determined by cell voltage module 1006. The temperatures of cells 301*a-n* are determined by cell temperature module 1008. The cell voltage and cell temperature information is used by non-traction battery controller 302 to ensure that battery 300 is operating safely within specified voltage and temperature ranges.

BMS module 304 is responsible for maintaining the cell balance of battery 300. This is done using cell balancing module 1004. In embodiments, cell balancing module 1004 can comprise any of the known active or passive cell balancing circuits such as, for example, top-balancing shunting resistors.

In an embodiment, cell balancing module 1004 operates under the control of computer program code executing on processor 1000. The computer program code uses voltage information provided by cell voltage module 1006 and stored in memory 1002, for example, to open and close switches associated with top-balancing shunting resistors of cell balancing module 1004.

Figure 11:
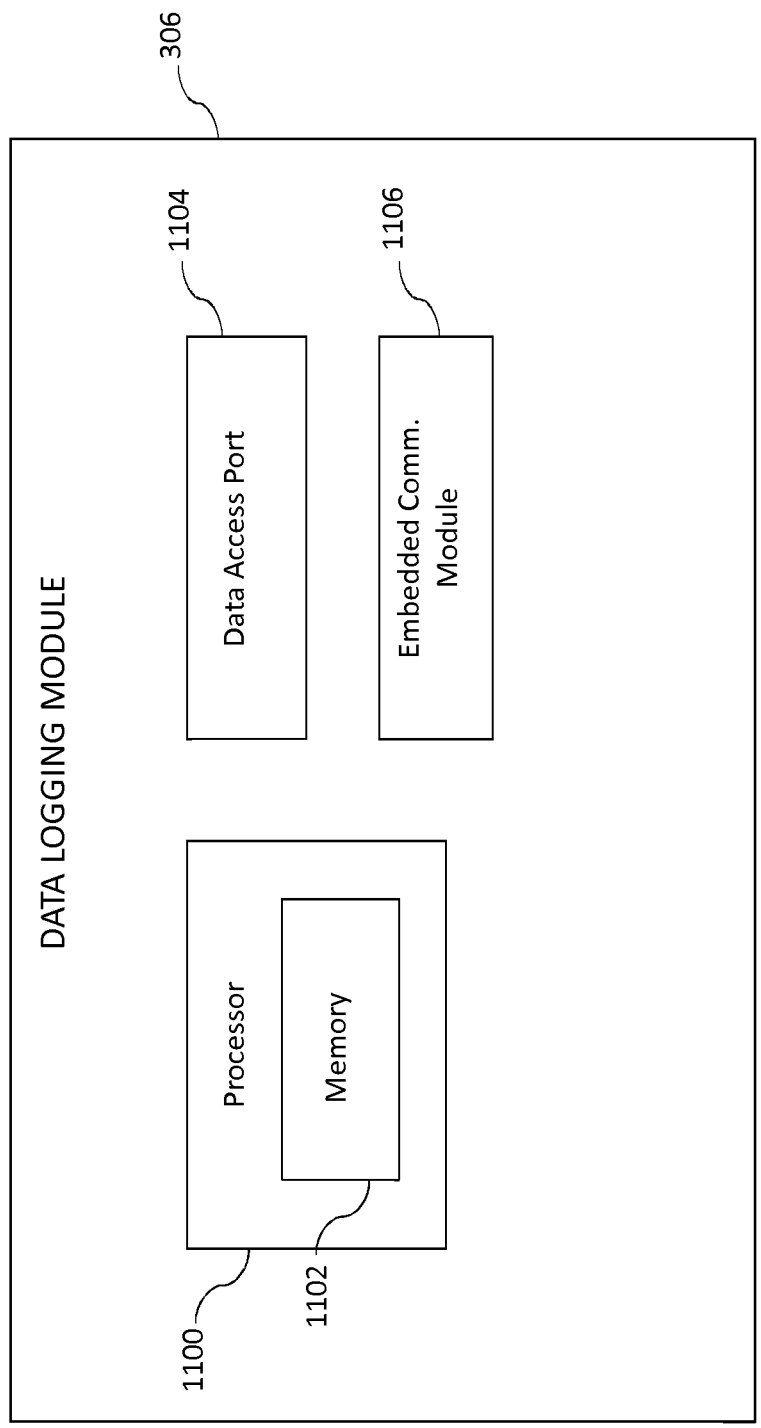
FIG. 11 is a diagram that illustrates an embodiment of a data logging module according to the present invention.

FIG. 11 is a diagram that further illustrates data logging module 306 according to an embodiment of the present invention. Data logging module 306 includes a processor 1100 having a memory 1102, a data access port 1104, and an embedded communication module 1106.

Data logging module 306 allows a user to access stored operation and performance data of battery pack 100 and the vehicle in which it is installed. Operation and performance information is received by data logging module 306, for example, from main processor 308 and stored in memory 1102. The information stored in memory 1102 it retrieved/read from memory 1102 using data access port 1104. In embodiments, data access port 1104 can be any known input/output port such as, for example, a USB port.

Figure 12:
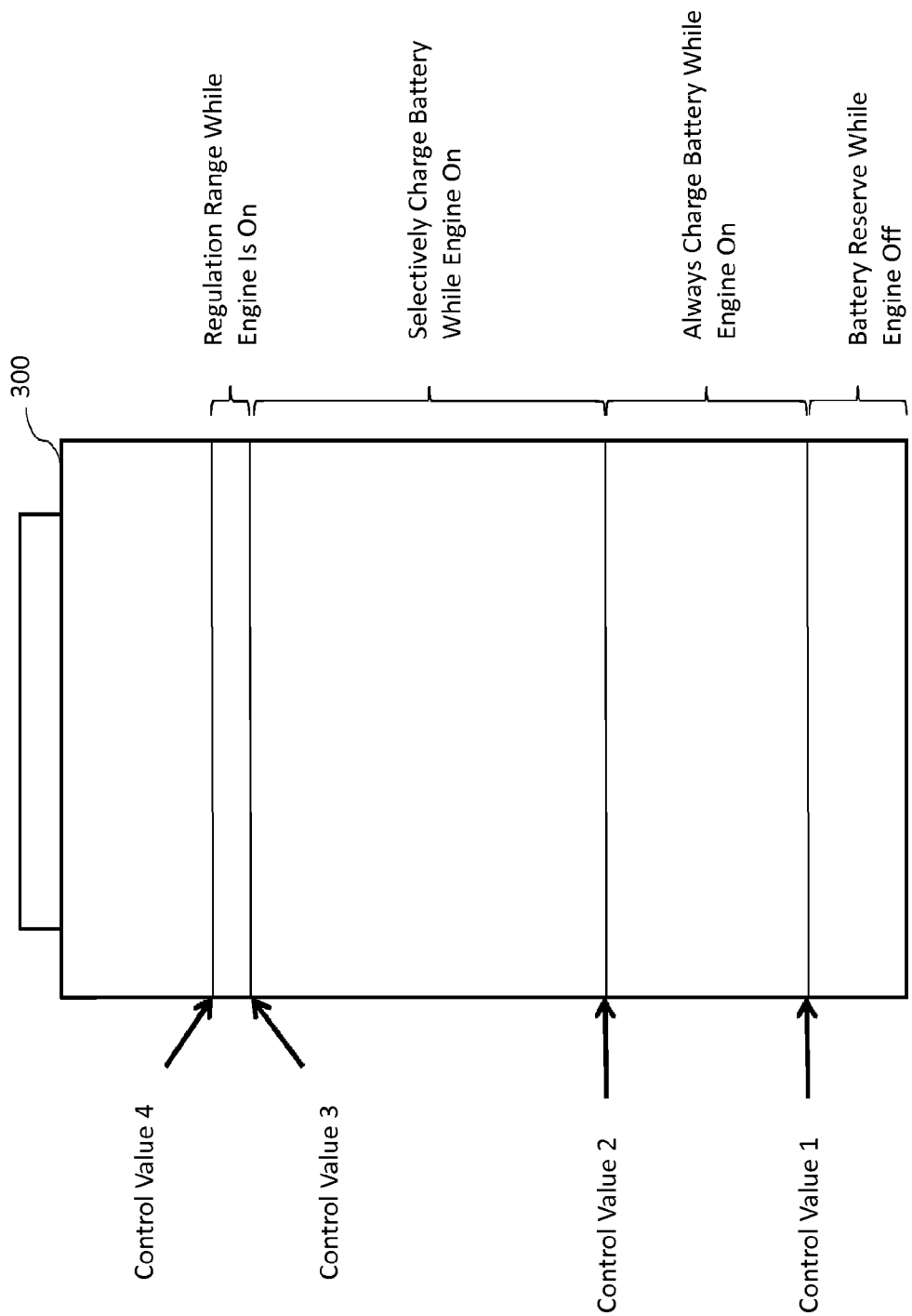
FIG. 12 is a diagram that illustrates how computer program code of a non-traction battery controller responds to various control values according to an embodiment of the present invention.

FIG. 12 is a diagram that illustrates how computer program code operating on the processor(s) of non-traction battery controller 302 responds to a number of control values to charge battery 300 according to an embodiment of the present invention. In embodiments, four control values are used as shown in FIG. 12.

Control value 1 is used to prevent battery 300 from being fully discharged. In an embodiment, contactor 314 is opened when battery 300 is discharged to the level represented by control value 1 to prevent further discharge of battery 300. Control value 1 may be, for example, a voltage level of battery 300 or a state-of-charge level of battery 300. Opening contactor 314 when control value 1 is reached is useful, for example, when the vehicle in which battery pack 100 is installed has been parked for an extended period of time and active loads in the vehicle are drawing power from battery 300 while it is parked. In embodiments, control value 1 is preferably selected so that contactor 314 opens at a level where battery 300 still has sufficient stored charge to start the vehicle in which battery pack 100 is installed.

When the voltage or state-of-charge of battery 300 is in a range determined by control value 1 and control value 2, battery 300 is always being charged while the engine of the vehicle in which battery pack 100 is installed is on. This is done because it is desirable to maintain a minimum amount of stored energy in battery 300, for example, to power the vehicle's non-traction loads when the vehicle is parked and the engine turned-off between periods of use.

When the voltage or state-of-charge of battery 300 is in a range determined by control value 2 and control value 3, battery 300 is selectively charged while the engine of the vehicle in which battery pack 100 is installed is on. The selective charging is done in order to improve the fuel efficiency of the vehicle in which battery pack 100 is installed. How battery 300 is selectively charged is described in more detail below with respect to FIGS. 13-17.

When the voltage or state-of-charge of battery 300 is in a range determined by control value 3 and control value 4, the current used to charge battery 300 is reduced from a maximum current at or near the level of control value 3 to no current at or near control level 4. This reduction in charge current that takes place between control level 3 and control level 4 is to maximize the life of battery 300 and to prevent charger 320 from over-charging battery 300.

Figure 13:
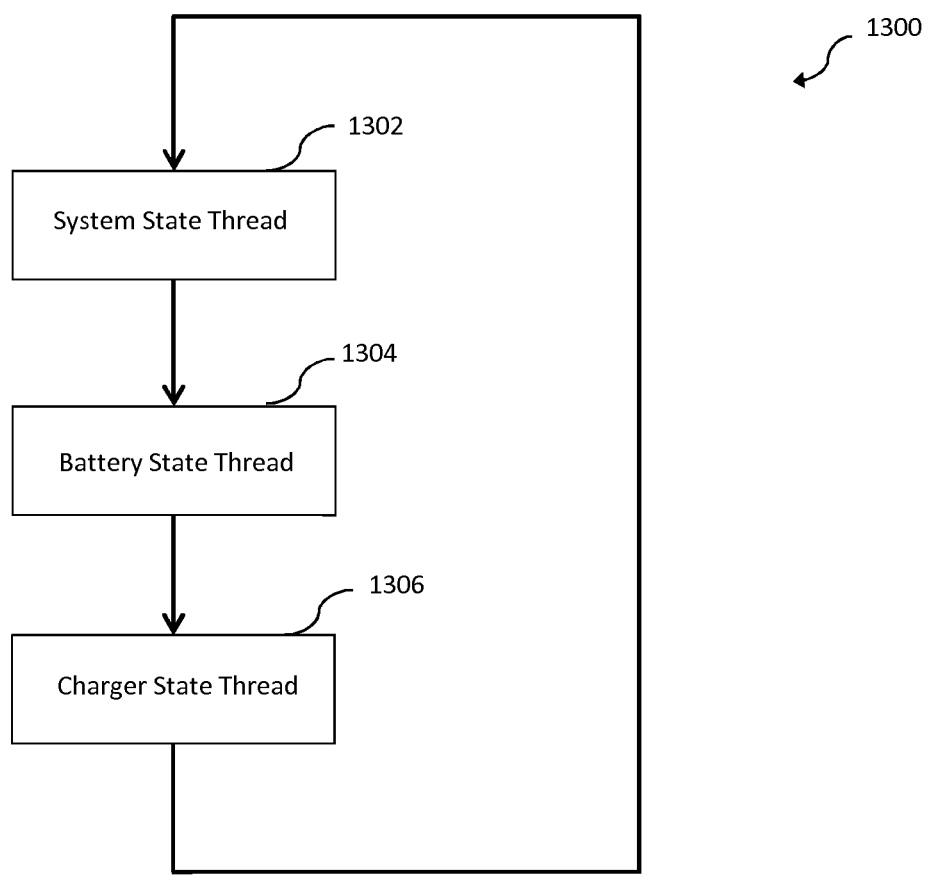
FIG. 13 is a diagram of a flowchart that illustrates computer program code for scheduling program threads according to an embodiment of the present invention.

FIG. 13 is a diagram of a flowchart 1300 that illustrates the operation of computer program code used for scheduling program threads according to an embodiment of the present invention.

As shown in FIG. 13, flowchart 1300 has three steps. In step 1302, the system state thread computer program code is run. In step 1304, the battery state thread computer program code is run. In step 1306, the charger state thread computer program code is run. More details about each of these computer program code threads is described below.

Figure 14:
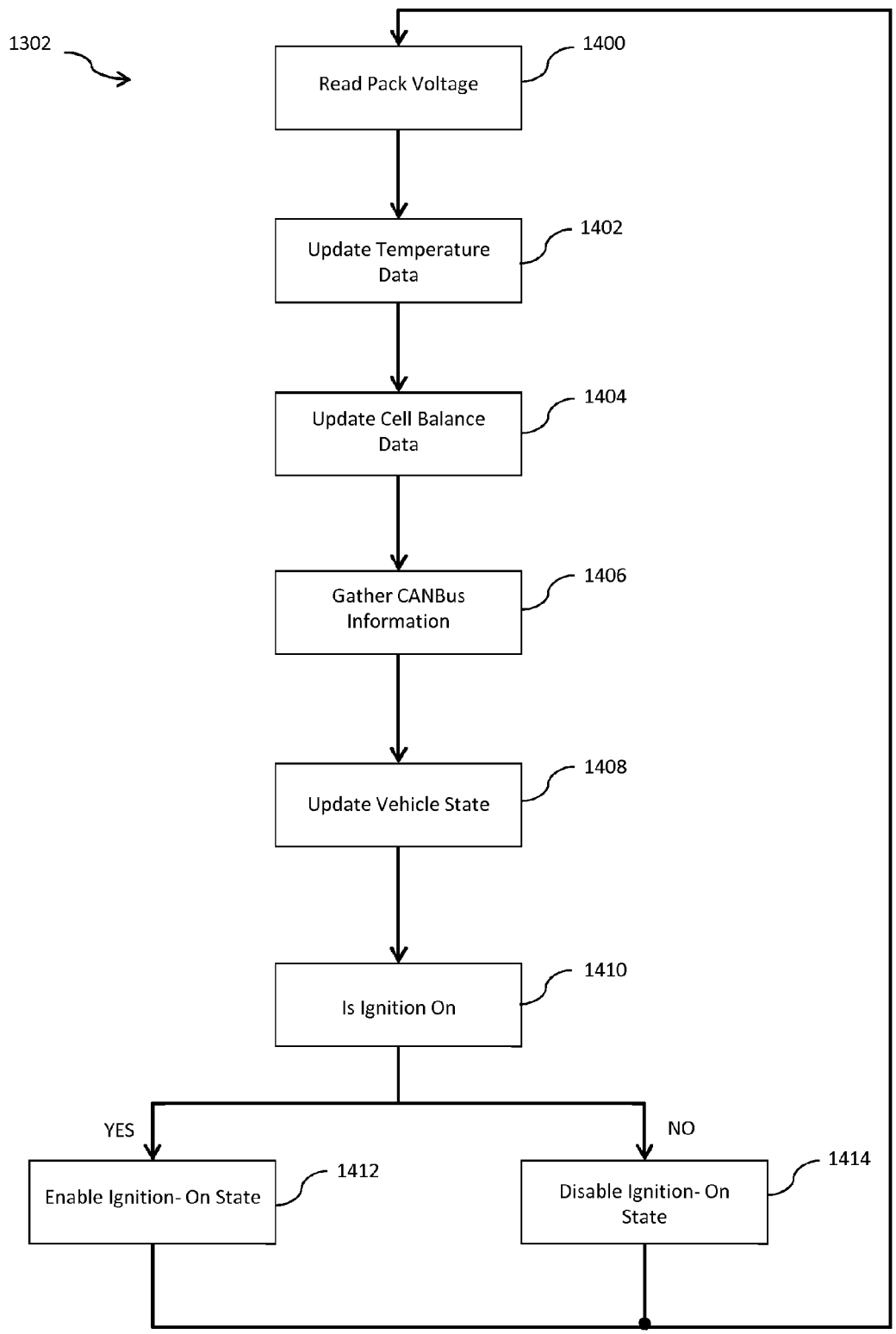
FIG. 14 is a diagram of a flowchart that illustrates computer program code for determining a system state according to an embodiment of the present invention.

FIG. 14 is a diagram of a flowchart that further illustrates the computer program code of step 1302 of flowchart 1300. The computer program code determines a system state according to an embodiment of the present invention. As shown in the flowchart of FIG. 14, there are eight steps.

In step 1400, the voltage of battery 300 is obtained. In an embodiment, the battery voltage is obtained by cell voltage module 1006 of BMS module 304 and stored in memory 1002. The voltage value stored in memory 1002 is then transferred to memory 309 of main processor 308.

In step 1402, all the temperature values of battery pack 100 are obtained. In embodiments, this includes the temperatures of the cells of battery 300 and the temperature of equalizer 322, if present. The temperatures of the cells of battery 300 are obtained in an embodiment by cell temperature module 1008 of BMS module 304 and stored in memory 1002. These temperature values are then transferred to memory 309 of main processor 308. The temperature of equalizer 322, if present, is obtained by fan control module 502 and used to turn-on and turn-off fans as necessary to maintain the temperature of equalizer 322 within its specified temperature operating limits.

In step 1404, data relating to the balance state of the cells of battery 300 are obtained. In embodiments, this data includes the voltages of cells 301a-n as well as the position of switches that control the operation of shunting resistors used to balance cells 301a-n. This data is obtained by BMS module 304 and transferred to memory 309 of main processor 308.

In step 1406, data about the state of the vehicle in which battery pack 100 is installed is obtained. In embodiments, this data is obtained by decoding CANBus messages received by vehicle communication module 310. This data includes, for example, information about the vehicle's speed, the engine's RPMs, the vehicle's accelerator pedal position, the vehicle's fuel consumption rate, etc. This data is transferred to main processor 308 and stored in memory 309.

In step 1408, vehicle state variables are updated. More details about this step are described below with reference to FIG. 15.

In step 1410, a determination is made whether the vehicle in which battery pack 100 is installed has its ignition on. If the ignition is on, control is passed to step 1412. If the ignition is off, control is transferred to step 1414.

In step 1412, an ignition-on state variable is set/enabled. From step 1412, control is transferred to step 1400.

In step 1414, an ignition-on state variable is reset/disabled. From step 1414, control is transferred to step 1400.

Figure 15:
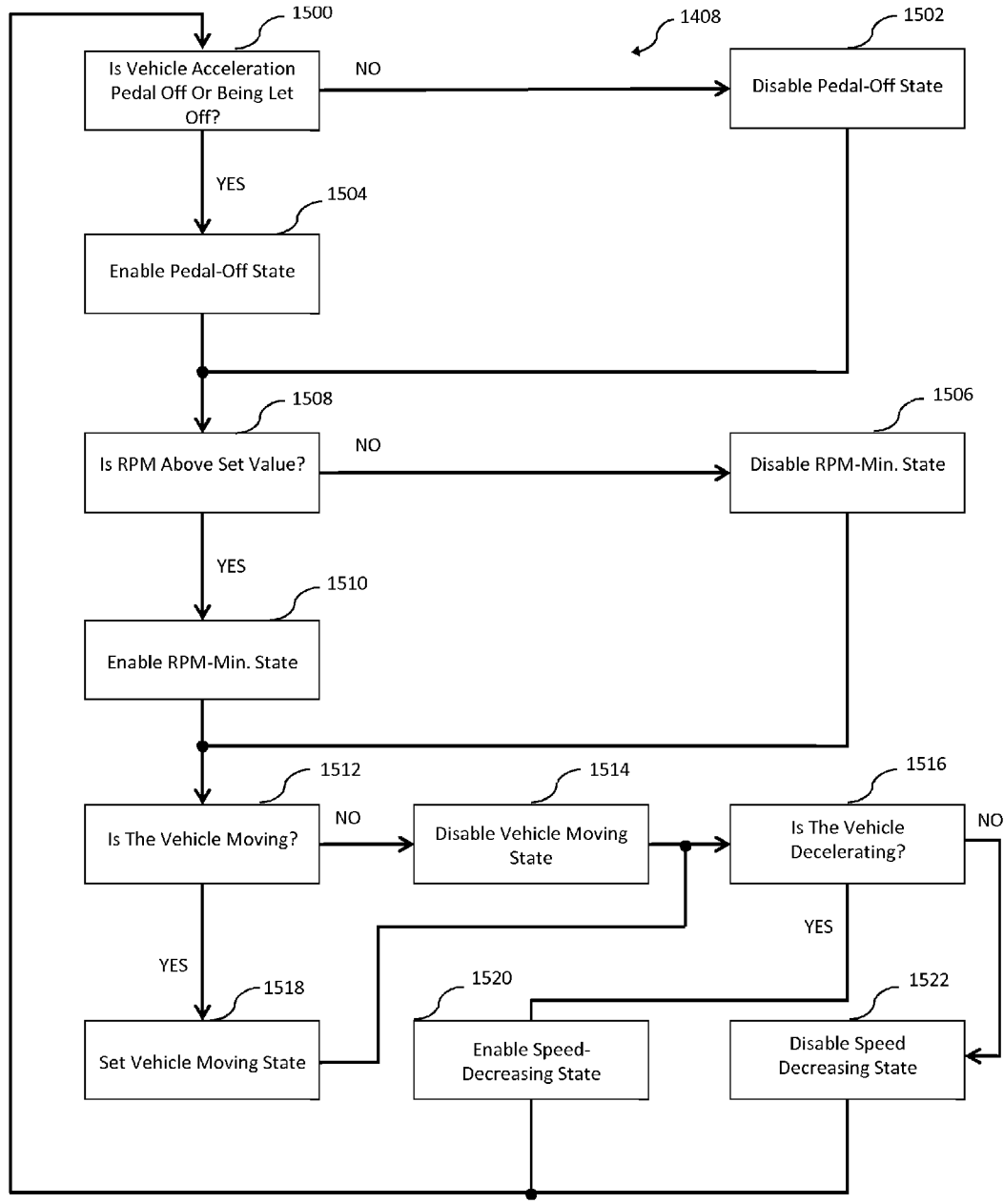
FIG. 15 is a diagram of a flowchart that illustrates computer program code for determining a vehicle's state according to an embodiment of the present invention.

FIG. 15 is a diagram of a flowchart that further illustrates the computer program code of step 1408 of the flowchart in FIG. 14. The computer program code determines a vehicle's state according to an embodiment of the present invention. As shown in the flowchart of FIG. 15, there are twelve steps.

In step 1500, a determination is made about whether the vehicle's accelerator pedal is off or being let off. If the vehicle's accelerator pedal is not off or not being let off, control is transferred to step 1502. In step 1502, a pedal-off state variable is reset/disabled. From step 1502, control passes to step 1508. If the vehicle's accelerator pedal is off or is being let off, control is transferred to step 1504. In step 1504, the pedal-off state variable is set/enabled. From step 1504, control passes to step 1508.

In step 1508, a determination is made whether the vehicle's engine RPM value is above a minimum RPM value. If the engine RPM value is not above the minimum value, control is transferred to step 1506. In step 1506, an RPM minimum state variable is reset/disabled. From step 1506, control passes to step 1512. If the engine RPM value is above the minimum value, control is transferred to step 1510. In step 1510, an RPM minimum state variable is set/enabled. From step 1510, control passes to step 1512.

In step 1512, a determination is made whether the vehicle is moving. If the vehicle is not moving, control is transferred to step 1514. In step 1514, a vehicle moving state variable is reset/disabled. From step 1514, control passes to step 1516. If the vehicle is moving, control is transferred to step 1518. In step 1518, the vehicle moving state variable is set/enabled. From step 1518, control passes to step 1516.

In step 1516, a determination is made whether the vehicle is decelerating. If the vehicle is not decelerating, control is transferred to step 1522. In step 1522, a speed decreasing state variable is reset/disabled. From step 1522, control passes to step 1500. If the vehicle is decelerating, control is transferred to step 1520. In step 1520, the speed decreasing state variable is set/enabled. From step 1520, control passes to step 1500.

In embodiments, the values of the state variables described above with reference to the flowchart of FIG. 15 are stored in memory 309 of main processor 308.

Figure 16:
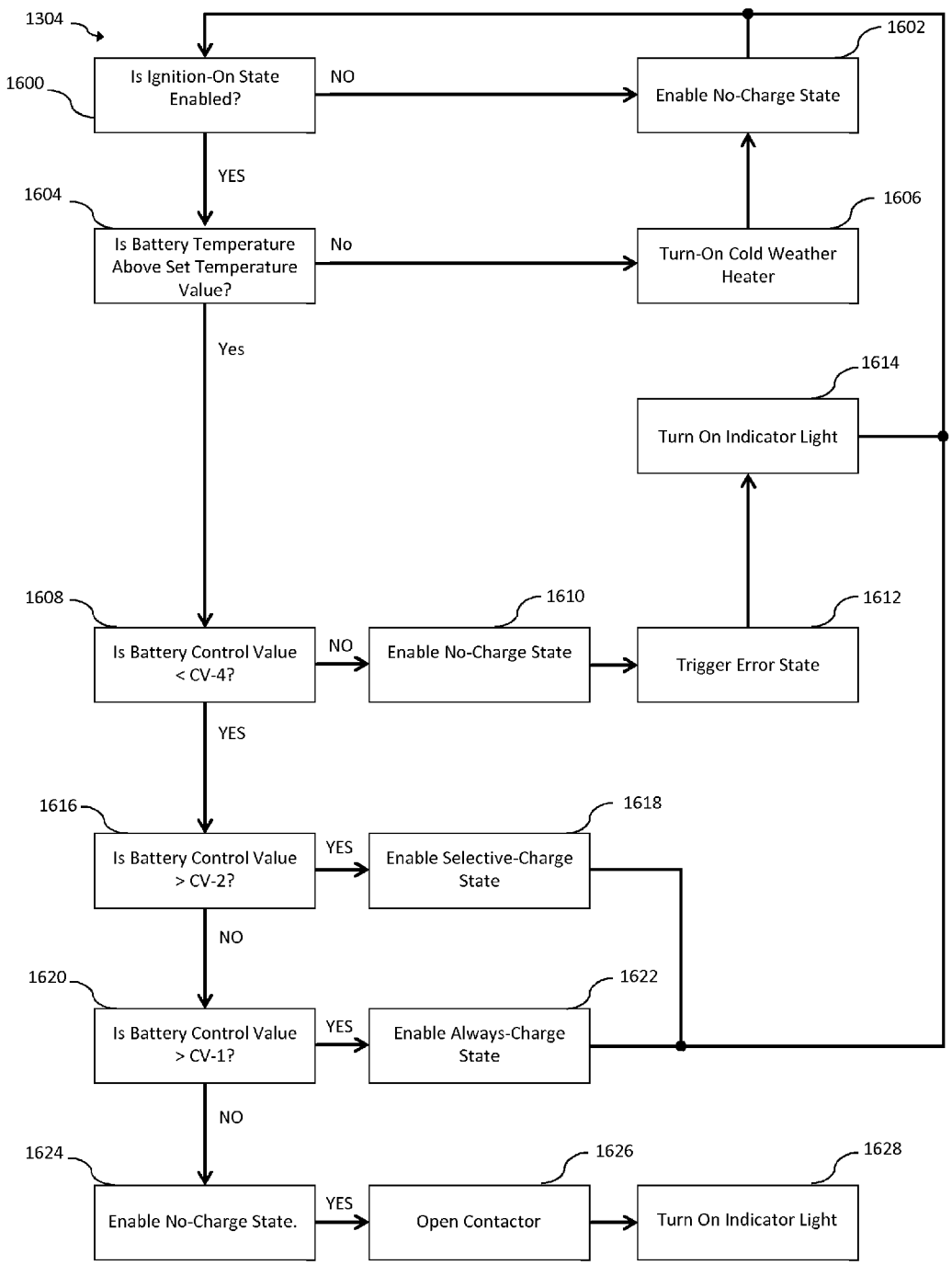
FIG. 16 is a diagram of a flowchart that illustrates computer program code for determining a battery state according to an embodiment of the present invention.

FIG. 16 is a diagram of a flowchart that further illustrates the computer program code of step 1304 of flowchart 1300. The computer program code determines a battery state according to an embodiment of the present invention. The flowchart starts at step 1600.

In step 1600, the ignition-on state variable is checked. If the variable is reset/disabled, then control passes to step 1602. In step 1602, a no-charge state variable is set/enabled. From step 1602, control passes to step 1600. If the ignition-on state variable is set/enabled, control passes to step 1604.

In step 1604, a determination is made whether the temperature of battery 300 is above a minimum temperature specified for charging battery 300. If the temperature is above the minimum temperature, control passes to step 1608. If the temperature is not above the minimum temperature, control passes to step 1606. In step 1606, an optional cold-weather heater is turned-on to warm up the battery. From step 1606, control passes to step 1602.

In step 1608, a determination is made whether the battery control value (e.g., battery voltage and/or battery state-of-charge) is less than control value 4 (CV-4). In step 1608, if a determination is made that the battery control value is less than control value 4, control passes to step 1616. If the battery control value is not less than control value 4, control passes to step 1610. In step 1610, a no-charge state variable is set/enabled, and control passes to step 1612. In step 1612, an error state variable is set/enabled, and control passes to step 1614. In step 1614, an indicator light is turned-on, and control passes to step 1600.

In step 1616, a determination is made whether the battery control value is greater than control value 2 (CV-2). If the battery control value is greater than control value 2, control passes to step 1618. In step 1618, a selective-charge state variable is set/enabled, and control passes to step 1600. In step 1616, if a determination is made that the battery control value is not great than control value 2, control passes to step 1620.

In step 1620, a determination is made whether the battery control value is greater than control value 1 (CV-1). If the battery control value is greater than control value 1, control passes to step 1622. In step 1622, an always-charge state variable is set/enabled, and control passes to step 1600. In step 1620, if a determination is made that the battery control value is not great than control value 1, control passes to step 1624.

In step 1624, a no-charge state variable is set/enabled, and control passes to step 1626. In step 1626, a contactor (e.g., contactor 314 in FIG. 3) is opened to prevent further discharge of the battery by the vehicle's loads, and control passes to step 1628. In step 1628, and indicator light is turned on.

Figure 17:
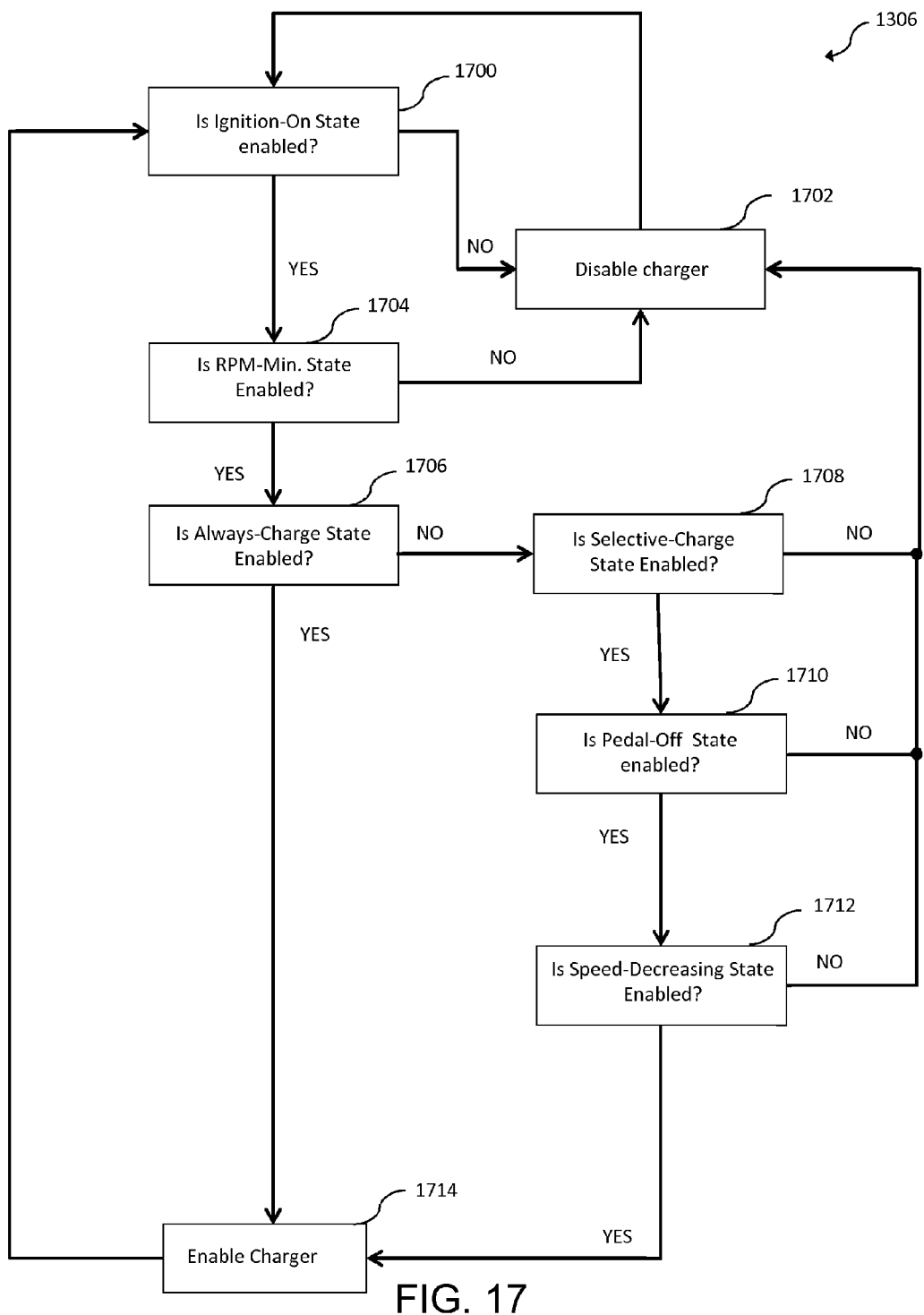
FIG. 17 is a diagram of a flowchart that illustrates computer program code for determining a charger state according to an embodiment of the present invention.

FIG. 17 is a diagram of a flowchart that further illustrates the computer program code of step 1306 of flowchart 1300. The computer program code determines a charger state according to an embodiment of the present invention. The flowchart starts with step 1700.

In step 1700, a determination is made whether an ignition-on state variable is set/enabled. If the ignition-on state variable is not set/enabled, then control passes to step 1702. In step 1702, the charger (e.g., charger 320) is disabled. If a determination is made in step 1700 that the ignition-on state variable is set/enabled, then control passes to step 1704.

In step 1704, a determination is made whether an RPM-minimum state variable is set/enabled. If the RPM-minimum state variable is not set/enabled, then control passes to step 1702. If a determination is made in step 1700 that the RPM-minimum state variable is set/enabled, then control passes to step 1706.

In step 1706, a determination is made whether an always-charge state variable is set/enabled. If the always-charge state variable is not set/enabled, then control passes to step 1708. If a determination is made in step 1706 that the always-charge state variable is set/enabled, then control passes to step 1714.

In step 1708, a determination is made whether a selective-charge state variable is set/enabled. If the selective-charge state variable is not set/enabled, then control passes to step 1702. If a determination is made in step 1708 that the selective-charge state variable is set/enabled, then control passes to step 1710.

In step 1710, a determination is made whether a pedal-off state variable is set/enabled. If the pedal-off state variable is not set/enabled, then control passes to step 1702. If a determination is made in step 1710 that the pedal-off state variable is set/enabled, then control passes to step 1712.

In step 1712, a determination is made whether a speed-decreasing state variable is set/enabled. If the speed-decreasing state variable is not set/enabled, then control passes to step 1702. If a determination is made in step 1712 that the speed-decreasing state variable is set/enabled, then control passes to step 1714.

In step 1714, the charger is enabled so that the battery (e.g., battery 300) can be charged. As will be understood by persons skilled in the relevant arts give the description herein, only enabling the charger under the conditions described herein can improve the overall fuel efficiency of a vehicle in which battery pack 100 is installed. The fuel efficiency is improved, for example, because the battery is only charged when the vehicle is running fuel efficiently and not charged when the vehicle is running less fuel efficiently, unless required to be charged to continue powering the vehicle's loads. The charging described herein also captures some of the vehicle's momentum energy and uses this energy to charge the battery, which otherwise would be dissipated by the vehicle's brakes as heat.

FIGS. 18A-C are diagrams that illustrate how a non-traction battery pack 100 according to an embodiment of the present invention can be installed in a bus 102.

As shown in FIG. 18A, battery pack 100 is installed in a battery tray 1802 on one side of bus 102. Battery tray 1802 is located behind a battery access door 1800 of bus 102. In embodiments, battery tray 1802 is the tray that held the bus' original batteries in instances where battery pack 100 is being retrofitted into a bus. Once battery pack 100 is installed on battery tray 1802, the bus' battery power cables 1804 are connected to the battery terminals 1806 of battery pack 100.

In addition to connecting battery power cables 1804 to the terminals of battery pack 100, two other connections must be made as part of the battery pack install process. These two connections are connecting non-traction battery controller 302 to the bus' alternator field winding and to the bus' vehicle communication bus (e.g., CANBus circuit).

FIG. 18B shows an alternator 1810 of bus 102. Alternator 1810 is located within engine compartment 1809 behind an engine compartment access door 1808. Alternator 1810 is used to charge battery 300 of battery pack 100. In embodiments, a field winding of alternator 1810 is selectively energized as described herein by charge control module 312. Thus, the charge control module is connected to the alternator's field winding to control when battery 300 of battery pack 100 is charged.

FIG. 18C shows an endpoint connector 1812 of a CANBus communication circuit (i.e., vehicle communication bus) of bus 102. In embodiments, the endpoint connector is a part of a fan unit 1816 of bus 102, and it is connected to vehicle communication module 310 of non-traction battery controller 302. This enables vehicle communication module 310 to receive data about bus 102 as described here.

As will be understood by persons skilled in the relevant art(s) given the description herein, various features of the invention can be implemented using processing hardware, firmware, software and/or combinations thereof such as, for example, application specific integrated circuits (ASICs). Implementation of these features using hardware, firmware and/or software will be apparent to a person skilled in the relevant art. Furthermore, while various embodiments of the invention have been described above, it should be understood that they have been presented by way of example, and not limitation. It will be apparent to persons skilled in the relevant art(s) that various changes can be made therein without departing from the scope of the invention.

As will be appreciated by one skilled in the art, aspects of the present disclosure may be embodied as a system, method, or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples of a computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of the present disclosure, a computer-usable or computer-readable medium may be any medium that can contain, store, communicate, propagate, or transport the program for use by or in connection with the instruction execution system, processor, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, or RF.

Computer program code for carrying out operations of the embodiments of the disclosure may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 19, an illustrative diagram of a data processing environment is provided in which illustrative embodiments may be implemented. It should be appreciated that FIG. 19 is only provided as an illustration of one implementation and is not intended to imply any limitation with regard to the environments in which different embodiments may be implemented. Many modifications to the depicted environments may be made.

Now considering FIG. 19, a block diagram of a data processing system is depicted in accordance with the present disclosure. In this illustrative example, data processing system 2200 includes communications fabric 2202, which provides communications between processor unit 2204, memory 2206, persistent storage 2208, communications unit 2210, input/output (I/O) unit 2212, and display 2214.

Processor unit 2204 serves to execute instructions for software that may be loaded into memory 2206. Processor unit 2204 may be a number of processors, a multi-processor core, or some other type of processor, depending on the particular implementation. A number, as used herein with reference to an item, means one or more items. Further, processor unit 2204 may be implemented using a number of heterogeneous processor systems in which a main processor is present with secondary processors on a single chip. As another illustrative example, processor unit 2204 may be a symmetric multi-processor system containing multiple processors of the same type.

Memory 2206 and persistent storage 2208 are examples of storage devices 2216. A storage device is any piece of hardware that is capable of storing information, such as, for example, without limitation, data, program code in functional form, and/or other suitable information on either a temporary basis and/or a permanent basis. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices such as a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these examples, provides for communications with other data processing systems or devices. In these examples, communications unit 2210 may be a network interface card. Communications unit 2210 may provide communications through the use of either or both physical and wireless communications links.

Input/output unit 2212 allows for input and output of data with other devices that may be connected to data processing system 2200. For example, input/output unit 2212 may provide a connection for user input through a keyboard, a mouse, and/or some other suitable input device. Further, input/output unit 2212 may send output to a printer. Display 2214 provides a mechanism to display information to a user.

Instructions for the operating system, applications, and/or programs may be located in storage devices 2216, which are in communication with processor unit 2204 through communications fabric 2202. In these illustrative examples, the instructions are in a functional form on persistent storage 2208. These instructions may be loaded into memory 2206 for execution by processor unit 2204. The processes of the different embodiments may be performed by processor unit 2204 using computer implemented instructions, which may be located in a memory, such as memory 2206.

These instructions are referred to as computer program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these examples. In one example, computer readable media 2220 may be computer readable storage media 2224 or computer readable signal media 2226. Computer readable storage media 2224 may include, for example, an optical or magnetic disk that is inserted or placed into a drive or other device that is part of persistent storage 2208 for transfer onto a storage device, such as a hard drive, that is part of persistent storage 2208. Computer readable storage media 2224 also may take the form of a persistent storage, such as a hard drive, a thumb drive, or a flash memory, that is connected to data processing system 2200. In some instances, computer readable storage media 2224 may not be removable from data processing system 2200. In these illustrative examples, computer readable storage media 2224 is a non-transitory computer readable storage medium.

Alternatively, program code 2218 may be transferred to data processing system 2200 using computer readable signal media 2226, Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical and/or wireless in the illustrative examples.

In some embodiments, program code 2218 may be downloaded over a network to persistent storage 2208 from another device or data processing system through computer readable signal media 2226 for use within data processing system 2200. For instance, program code stored in a computer readable storage medium in a server data processing system may be downloaded over a network from the server to data processing system 2200. The data processing system providing program code 2218 may be a server computer, a client computer, or some other device capable of storing and transmitting program code 2218.

The different components illustrated for data processing system 2200 are not meant to provide architectural limitations to the manner in which different embodiments may be implemented. The different advantageous embodiments may be implemented in a data processing system including components in addition to or in place of those illustrated for data processing system 2200. Other components shown in FIG. 19 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 2200 may be any hardware apparatus that may store data. Memory 2206, persistent storage 2208, and computer readable media 2220 are examples of storage devices in a tangible form.

In another example, a bus system may be used to implement communications fabric 2202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 2206, or a cache such as found in an interface and memory controller hub that may be present in communications fabric 2202.

It should be appreciated that the detailed description of the invention provided herein, and not the summary and abstract sections, is intended to be used to interpret the claims. The summary and abstract sections may set forth one or more but not all exemplary embodiments of the invention as contemplated by the inventor.

What is claimed is:

1. A non-traction battery controller configured to control a battery that powers non-traction loads of a vehicle, comprising:
    a main processor,
    a battery management module coupled to the main processor;
    a vehicle communication module coupled to the main processor; and
    a charge control module coupled to the main processor;
    wherein the main processor is configured to
        signal the charge control module to charge the battery when the vehicle communication module signals the processor that an engine of the vehicle is operating and the battery management module signals the processor that the battery has a state value less than a first control value, and
        signal the charge control module to selectively charge the connected battery when the vehicle communication module signals the processor that the engine of the vehicle is operating and the battery management module signals the processor that the battery has a state value between the first control value and a second control value,
        wherein the first control value and the second control value are based on battery voltage values.

2. The non-traction battery controller of claim 1, wherein the first control value and the second control value are battery voltage values.

3. The non-traction battery controller of claim 1, wherein the first control value and the second control value are battery state-of-charge values.

4. The non-traction battery controller of claim 1, wherein the main processor is further configured to
    signal the charge control module to selectively charge the connected battery when the vehicle communication module signals the processor that the vehicle is moving.

5. The non-traction battery controller of claim 1, wherein the main processor is further configured to
    signal the charge control module to selectively charge the connected battery when the vehicle communication module signals the processor that the engine of the vehicle is operating at greater than a first revolutions-per-minute value.

6. The non-traction battery controller of claim 1, wherein the main processor is further configured to
    signal the charge control module to not charge the connected battery when the battery management module signals the processor that a state of the battery is greater than a third control value, wherein the third control value is greater than the first and second control values.

7. The non-traction battery controller of claim 1, wherein the main processor is further configured to
    signal a contactor to open when the battery management module signals the processor that a voltage of a cell of the battery is less than an under-voltage protection value.

8. The non-traction battery controller of claim 1, wherein the main processor is further configured to
    signal a contactor to open when the battery management module signals the processor that a voltage of a cell of the battery is greater than an over-voltage protection value.

9. The non-traction battery controller of claim 1, wherein the charge control module generates a pulse width modulation signal for controlling a power output of an alternator.

10. The non-traction battery controller of claim 1, wherein the vehicle communication module decodes a message relating to a position of an accelerator pedal of the vehicle.

11. A non-traction battery pack configured to power non-traction loads of a vehicle, comprising:
a main processor;
a battery management module coupled to the main processor;
a battery coupled to the battery management module;
a vehicle communication module coupled to the main processor; and
a charge control module coupled to the main processor;
wherein the main processor is configured to
signal the charge control module to always charge the battery when the vehicle communication module signals the processor that an engine of the vehicle is operating and the battery management module signals the processor that the battery has a state value less than a first control value, and
signal the charge control module to selectively charge the battery when the vehicle communication module signals the processor that the engine of the vehicle is operating and the battery management module signals the processor that the battery has a state value between the first control value and a second control value,
wherein the first control value and second control value are based on battery voltage values.

12. The non-traction battery pack of claim 11, wherein
the first control value and the second control value are battery voltage values.

13. The non-traction battery pack of claim 11, wherein the main processor is further configured to
signal the charge control module to selectively charge the battery when the vehicle communication module signals the processor that the vehicle is moving.

14. The non-traction battery pack of claim 11, wherein the main processor is further configured to
signal the charge control module to selectively charge the battery when the vehicle communication module signals the processor that the engine of the vehicle is operating at greater than a first revolutions-per-minute value.

15. The non-traction battery pack of claim 11, wherein the vehicle communication module decodes a message relating to a position of an accelerator pedal of the vehicle.

16. A vehicle, comprising:
an engine;
an alternator coupled to the engine; and
a non-traction battery pack configured to power non-traction loads of the vehicle and coupled to the alternator, wherein the non-traction battery pack includes
a main processor;
a battery management module coupled to the main processor;
a battery coupled to the battery management module;
a vehicle communication module coupled to the main processor; and
a charge control module coupled to the main processor;
wherein the main processor is further configured to
signal the charge control module to charge the battery when the vehicle communication module signals the processor that the engine of the vehicle is operating and the battery management module signals the processor that the battery has a state value less than a first control value, and
signal the charge control module to selectively charge the battery when the vehicle communication module signals the processor that the engine of the vehicle is operating and the battery management module signals the processor that the battery has a state value between the first control value and a second control value,
wherein the first control value and the second control value are based on battery voltage values.

17. The vehicle of claim 16, wherein
the first control value and the second control value are battery voltage values.

18. The vehicle of claim 16, wherein the main processor is further configured to
signal the charge control module to selectively charge the battery when the vehicle communication module signals the processor that the vehicle is moving.

19. The vehicle of claim 16, wherein the main processor is further configured to
signal the charge control module to selectively charge the battery when the vehicle communication module signals the processor that the engine of the vehicle is operating at greater than a first revolutions-per-minute value.

20. The vehicle of claim 16, wherein the vehicle communication module decodes a message relating to a position of an accelerator pedal of the vehicle.

* * * * *